(12) United States Patent
Landon

(10) Patent No.: US 6,793,955 B1
(45) Date of Patent: Sep. 21, 2004

(54) METHOD OF FORMING A BUTTER/ MARGARINE BLEND

(75) Inventor: Todd Landon, Mound, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 233 days.

(21) Appl. No.: 10/110,887

(22) PCT Filed: Oct. 18, 2000

(86) PCT No.: PCT/US00/41264

§ 371 (c)(1),
(2), (4) Date: Apr. 15, 2002

(87) PCT Pub. No.: WO01/28348

PCT Pub. Date: Apr. 26, 2001

Related U.S. Application Data

(60) Provisional application No. 60/160,111, filed on Oct. 18, 1999, and provisional application No. 60/160,115, filed on Oct. 18, 1999.

(51) Int. Cl.$^7$ .............................................. A23C 15/16
(52) U.S. Cl. ..................... 426/581; 426/530; 426/603
(58) Field of Search ................................. 426/581, 530, 426/603, 601, 604

(56) References Cited

U.S. PATENT DOCUMENTS

| | | |
|---|---|---|
| 1,024,009 A | 4/1912 | Kronenberger |
| 2,572,287 A | 10/1951 | Strezynski .................... 259/96 |
| 2,617,731 A | 11/1952 | Patton et al. .................. 99/119 |
| 2,754,193 A | 7/1956 | Jones et al. ................... 99/123 |
| 3,443,966 A | 5/1969 | Reid .......................... 99/118 |
| 3,946,122 A | 3/1976 | Scharp ........................ 423/604 |
| 4,051,269 A | 9/1977 | Strinning ..................... 426/603 |
| 4,160,850 A | 7/1979 | Hallstrom et al. ............. 426/601 |
| 4,425,370 A | 1/1984 | Graves ........................ 426/603 |
| 4,438,149 A | 3/1984 | Verhagen et al. .............. 426/603 |
| 4,447,463 A * | 5/1984 | Antenore et al. .............. 426/603 |
| 4,555,411 A | 11/1985 | Moran et al. ................. 426/603 |
| 4,702,928 A | 10/1987 | Wieske et al. ................ 426/607 |
| 4,820,539 A | 4/1989 | Lehmann et al. .............. 426/581 |
| 4,861,610 A | 8/1989 | Kato et al. ................... 426/582 |
| 4,882,187 A | 11/1989 | Izzo et al. .................... 426/335 |
| 4,952,606 A | 8/1990 | Babayan et al. ............... 514/552 |
| 4,961,951 A | 10/1990 | Crosby ........................ 426/602 |
| 5,112,636 A | 5/1992 | Girsh .......................... 426/581 |
| 5,268,190 A | 12/1993 | Gerhard ....................... 426/580 |
| 2,357,896 A | 9/1994 | Howe ........................... 99/121 |

FOREIGN PATENT DOCUMENTS

FR    2080763    11/1971

OTHER PUBLICATIONS

English Language Abstract of Max Erich Schultz; Edberhard Voss, Production of Readily Spreadable Dry Butter, 1967, vol. 3, pp 67–69, Int. Dairy Congr., Proc.
Abstract of F. A. Vyshemirskiy, N. V. Ivanova, Dried Concentrate of Butter: Granulometric Composition, Properties, Quality, 1993, No. 9303, pp. 453–454, International Dairy Federation Special Issue.
Abstract of US patent No. 4436760 Issued Mar. 13, 1984.
Abstract of US patent No. 4615892 Issued Oct. 7, 1986.
English Language Abstract of West German Patent Application No. 1 492 944, (1969).
English Language Abstract of Japanese Patent Document No. JP 62019049 A (Jul. 19, 1985).
English Language Abstract of Japanese Patent Document No. JP 05292880 A (Sep. 30, 1992).
Abstract of EPO Patent application EP 385541 A (Sep. 5, 1990).
Abstract of EPO Patent application EP 399580 A (Sep. 28, 1993).
Abstract of PCT Application No. WO 8910700 A (Sep. 23, 1993).
Abstract of PCT Application No. WO 9319611 A (Dec. 2, 1993).
English Language Abstract of Russian Patent Document No. RU 2054264 C (Nov. 15, 1996).
English Language Abstract of Russian Patent Document No. RU 2110184 C (Dec. 10, 1998).
Abstract of German Democratic Republic Patent Document No. DD 225327 A (Sep. 25, 1993).

* cited by examiner

Primary Examiner—Carolyn Paden
(74) Attorney, Agent, or Firm—Westman, Champlin & Kelly, P.A.

(57) ABSTRACT

A method of forming a butter/margarine blend that includes removing water of butterfat from a feed material that includes butter to yield an intermediate, combining a non-dairy fat with the intermediate to form an intermediate blend, and processing the intermediate blend to form the butter/margarine blend.

39 Claims, 1 Drawing Sheet

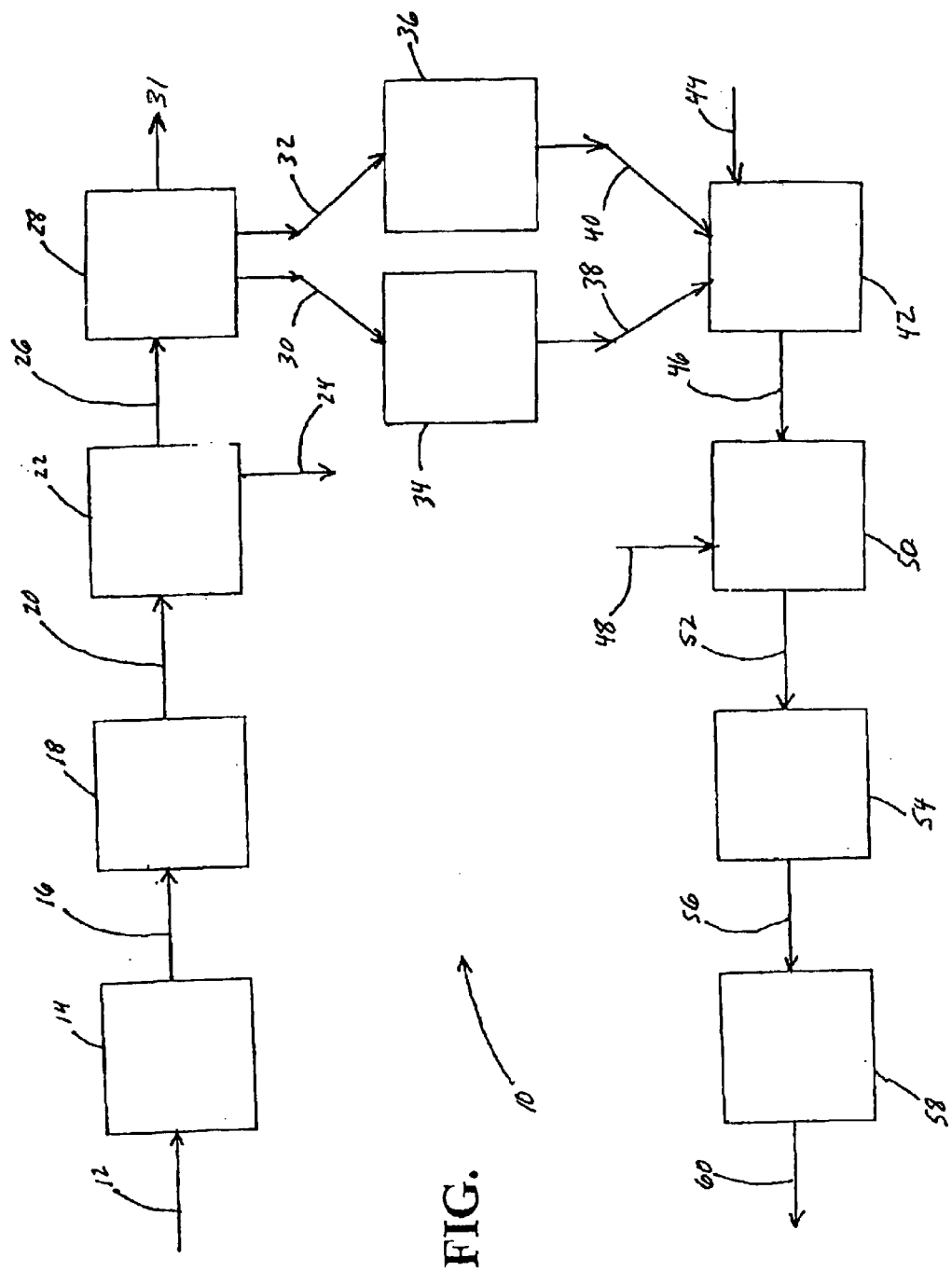

METHOD OF FORMING A BUTTER/MARGARINE BLEND

CROSS-REFERENCE TO RELATED APPLICATION(S)

This application claims priority from
(1) U.S. Provisional Patent Application Ser. No. 60/160,111 that was filed on Oct. 18, 1999,
(2) U.S. Provisional Patent Application Ser. No. 60/160,115 that was filed on Oct. 18, 1999,
(3) PCT International Application Number PCT/US00/41263 that was filed on Oct. 18,2000, and
(4) PCT International Application Number PCT/US00/41264 that was filed on Oct. 18, 2000.

BACKGROUND OF THE INVENTION

The present invention generally relates to a method of forming butter-based products, such as a butter/margarine blend, and to butter-based products that are prepared by this method. More specifically, the present invention relates to a method of concentrating interfacial butter solids of butter, to a method of incorporating the interfacial butter solids in butter-based products, and to butter-based products that contain a concentrated amount of the interfacial butter solids.

Butter preparation methods represent some of the oldest techniques for utilizing fat components that are found in milk. Butter manufacture has been accomplished in one form or another for over 4500 years. Over the centuries, butter has been used in sacrificial worship ceremonies, for medicinal and cosmetic purposes, and as a human food.

Butter production techniques generally evolved into more sophisticated techniques as new forms and uses of equipment developed. For example, the barrel churn made its appearance toward the end of the 18th century when non-wooden manufacturing materials entered widespread use in creaming and butter making equipment. These advances led to advances in cream separation techniques and, by 1879, continuous operation cream separators were known in Sweden, Denmark, and Germany. Likewise, butter production evolved from an individual farm activity to a factory based technique with the introduction of milk pooling systems for creamery operation in the 1870s. Later advances in fat quantification techniques, pasteurization, refrigeration, and bacterial culture usage further advanced the art of butter production.

Advances in butter production technology helped make butter a staple item in the kitchen. Certain components of butter, such as interfacial butter solids, give butter-based baked goods properties that are not achievable by margarines and presently available butter/margarine blends. For example, butter melts somewhat evenly in the mouth to yield a smooth, rich mouth-feel that is characteristic of butter. As another example, the protein and lactose components of butter give desirable browning characteristics to baked goods that incorporate butter. Also, the phospholipid portion of butter gives body to baked goods and gives the baked goods the characteristic rich flavor long associated with butter. Phospholipids, proteins, and sugars, such as lactose, are each components of interfacial butter solids.

Despite these highly desirable taste and baking properties associated with butter, butter consumption came under attack by nutritionists and the medical profession during the 1970s and 1980s because of links thought to exist between butter consumption and certain health conditions. Also, butter prices tend to be relatively volatile over the long term. These factors led to increasing use of butter substitutes, such as margarine and butter/margarine blends, that included fat sources in addition to, or other than, butterfat. Existing butter/margarine blends are typically based on butter; other fat sources, such as soybean oil, cotton seed oil, canola oil, and other types of vegetable oils; water; and emulsifying agents, such as monoglycerides and diglycerides. Margarines are typically based on various combinations of water and vegetable oils and may include or exclude butterfat, depending upon the formulation of the particular margarine.

However, even present margarines that include butterfat and present butter/margarine blends that include butter do not have the characteristic mouth-feel of butter and typically do not give baked goods the browning properties and body-yielding properties that are characteristic of butter. This is true even though numerous artificial butter flavoring compounds have been developed and incorporated into margarines and butter/margarine blends over the years.

Thus, even though these alternatives to pure butter have helped to reduce the amount of saturated fats and calories in the human diet and have helped to stabilize the cost of supplying nutritionally necessary fat in the human diet, these advances have come at the cost of losing butter-like baking properties, such as the browning and baking characteristics yielded by butter, and the rich flavor and characteristic mouth-feel exhibited by butter. Thus, consumers, including household consumers and commercial baking concerns alike, long for an improved butter/margarine blend that accommodates health concerns about butterfat while achieving baking properties, mouth-feel properties, and flavor and taste that equal or even exceed those exhibited by butter.

BRIEF SUMMARY OF THE INVENTION

The present invention concerns a method of forming a butter-based product, such as a butter/margarine blend, that includes removing water or butterfat from a feed material that includes butter to yield an intermediate, combining a non-dairy fat with the intermediate to form an intermediate blend, and processing the intermediate blend to form the butter-based product. The present invention further includes a method of forming a concentrated butter. The method of the present invention additionally includes a concentrated butter, a butter-based product, and a concentrated butter product.

BRIEF DESCRIPTION OF THE DRAWING

The FIGURE is a schematic of a process for producing a butter-based product, such as a butter/margarine blend, in accordance with the present invention.

DETAILED DESCRIPTION

The present invention generally relates to a method of forming butter-based products, such as a butter/margarine blend, and to butter-based products that are prepared by this method. More specifically, the present invention relates to a method of concentrating interfacial butter solids of butter, to a method of incorporating the interfacial butter solids in butter-based products, and to butter-based products that contain a concentrated amount of the interfacial butter solids.

A process for preparing the butter-based product, such as the butter/margarine blend, of the present invention is generally depicted at 10 in the FIGURE. First, a feed material 12, such as butter or a mixture of butter and one or more additional components, is heated using a heat exchange mechanism 14, such as a steam-jacketed pipe, to form a liquid feed material 16, such as melted butter or a liquid composition containing melted butter, and thereby remove all crystallization memory of the butter. The liquid feed material 16 is placed in an agitated and heated tank 18. Mixed liquid feed material 20 is then transferred from the tank 18 to an evaporator 22 to concentrate the mixed liquid feed material 20 by removing water 24 from the mixed liquid feed material 20 under controlled vacuum and temperature conditions.

A reduced water-content material 26 that is derived in the evaporator 22 is then transferred to a separator 28 and separated into butterfat 30, byproduct butterfat 31, and a butter solids intermediate 32. The byproduct butterfat 31 exits the process 10 for further processing or for sale to customers as butterfat The ratio of butterfat removed from the process 10 as byproduct butterfat 31 versus butterfat remaining in the process 10 as the butterfat 30 may be adjusted to provide products produced using the process 10 with different butterfat contents and concentrations. As an alternative to removing the byproduct butterfat 31 directly from the separator 28, excess butterfat beyond the butterfat required to produce the butter-based products of the present invention may be removed from the process 10 by removing byproduct butterfat from the butterfat 30 after separation of the butterfat 30 and the butter solids intermediate 32 in the separator 28.

The butterfat 30 is placed into a holding tank 34.and the butter solids intermediate 32 is placed into a holding tank 36. If any byproduct butterfat is removed from the butterfat 30, the byproduct butterfat removal may occur either before or after the butterfat 30 has been placed in the holding tank 34. The holding tank 34 and/or the holding tank 36 may be heated, as necessary, to maintain the butterfat 30 as a liquid and/or to maintain the butter solids intermediate 32 as a liquid. Additionally, the tanks 34, 36 may be agitated to maintain the homogeneity of the butterfat 30 and the homogeneity of the butter solids intermediate 32, respectively. The composition of the butterfat 30 may be left unchanged in the holding tank 34, and the composition of the butter solids intermediate 32 may be left unchanged in the holding tank 36.

On the other hand, an emulsifying agent may optionally be added to the tank 34 and thereafter may be dispersed within the butterfat 30. The ratio of emulsifying agent to butterfat 30 in the tank 34 may be selectively adjusted to attain desired properties in butter-based products, such as the butter-margarine blend, that may be produced using the process 10. Likewise, food grade salt may optionally be added to the tank 36 and thereafter may be dispersed within the butter solids intermediate 32. The ratio of salt to butter solids intermediate 32 in the tank 36 may be selectively adjusted to attain desired properties in butter-based products, such as the butter-margarine blend, that may be produced using the process 10.

The butterfat 30 is metered from the holding tank 34 as butterfat 38 into a weigh and mix tank 42, and the butter solids intermediate 32 is metered from the holding tank 36 as butter solids intermediate 40 to the weigh and mix tank 42. Non-dairy fat 44, such as vegetable oil, may optionally also be metered into the weigh and mix tank 42. The ratio of butterfat 38 to butter solids intermediate 40 to non-dairy fat 44 in the weigh and mix tank 42 may be selectively adjusted to attain desired properties in butter and butter-based products produced using the process 10. The butterfat 38, the butter solids intermediate 40, and the non-airy fat 44 are mixed together in the weigh and mix tank 42 to form a water-in-fat dispersion, namely an intermediate blend 46.

The intermediate blend 46 along with optional additive(s) 48 are combined, blended, and agitated in a blend tank 50 to form a liquid butter/margarine blend 52. The liquid butter/margarine blend 52 may then be conventionally processed in traditional margarine and butter crystallization equipment, such as a chill roller or a swept surface heater exchanger 54, to form a solidified butter/margarine blend 56. The solidified butter/margarine blend 56 may be packaged in conventional butter and margarine packing equipment, such as a packing unit 58, to yield a packaged butter/margarine product 60.

The butter-based product that exits the blend tank 50 is subsequently referred to primarily in terms of the butter/margarine blend 52. Nonetheless, it is to be understood that the butter-based products that exit the tank 42 and the tank 52, along with any derivatives of these butter-based products, may alternatively be butter, a reduced-fat butter, a butter-based spread, or any other water-in-fat dispersion that includes interfacial butter solids from the butter of the feed material 12 and may also include some water and/or butterfat from the butter of the feed material 12.

In the process 10, the feed material 12 may be or may include any butter. As used herein, all references to "butter" are to be understood as referring to a dairy product prepared by churning, or equivalently processing, milk, cream, or a combination of milk and cream, though other optional ingredients beyond milk and/or cream may optionally be included before, during and/or after the butter production. The churning or equivalent processing may be accomplished in either batch-wise or continuous fashion. The source of the milk and/or cream that is used to form the butter may be bovine, ovine, caprine, or the like. The butter that makes up some or all of the feed material 12 may generally take any form, such as semi-solid, pumpable butter that exits the churning process; chilled solid butter; or butter that has been melted to form liquid butter.

Non dairy ingredients, preferably other minor non-dairy ingredients, such as salt, a coloring agent, and/or vitamins, may optionally be included in the milk and/or cream that is churned to form the butter or may optionally be added to the milk and/or cream during the churning process. Preferably, however, salt, if added, is added at the tank 36, and other minor non-dairy ingredients, such as vitamins, lactic acid, and/or the coloring agent, are added at the blend tank 50 to simplify operational considerations for the evaporator 22 and the separator 28.

Non-dairy fat may also optionally be added to the milk and/or cream that is processed to form the butter or may be added to the milk and/or cream during the butter production process. Non-dairy fat is preferably not added to the milk and/or cream either before or during processing of the milk and/or cream to form the butter, since some of any such added non-dairy fat would likely be present in the butter milk byproduct of the butter forming process and would reduce the value of the byproduct butter milk. Also, non-dairy fat is preferably not added to the milk and/or cream either before or during processing of the milk and/or cream to form the butter, since any such addition of non-dairy fat would prevent the butter being formed from being labeled as butter, and would prevent butter-based products that exit the tank 42 and the tank 52, along with any derivatives of these butter-based products, from being labeled as butter-based products, such as the butter/margarine blend, under the present dietary labeling standards of United States regulatory authorities, such as the U.S. Department of Agriculture (U.S.D.A.).

Churning of milk and/or cream initially causes fractionation of the milk and/or cream into (1) an aqueous phase that yields a butter milk byproduct and (2) a fat phase that includes milk fat globules. The churning process also causes aggregation of milk fat globules that, with the aid of various interfacial butter solids such as phospholipids, entrap water molecules from the aqueous phase to form the water-in-fat dispersion that predominantly or exclusively exists in butter. It is believed that the water-in-fat dispersion of butter is not a true emulsion, but instead represents a surface absorption phenomena in which water is absorbed within a matrix of milk fat globules. Additionally, it is believed that the solids leaving as part of the aqueous butter milk byproduct of the churning process are qualitatively different in nature than the solids remaining in the butter produced by churning, since the taste of this aqueous butter milk byproduct is qualitatively quite different from the taste of the aqueous layer resulting when butter is melted and stratified into a fat layer and an aqueous layer.

Unless otherwise indicated, all references to "interfacial butter solids" are to be understood as referring to the solid particles and/or semi-solid particles that tend to congregate proximate the interface of the aqueous phase and the fat phase of melted butter (1) when the temperature of the melted butter is in the range of about 80° F. (about 26.7° C.) to about 145° F. (about 62.8° C.) and (2) when the aqueous phase and the fat phase are permitted to separate under the influence of gravity or when the aqueous phase and the fat phase are forced to separate, such as by processing the melted butter in a centrifuge. Some components of the "interfacial butter solids", such as proteins and sugars, tend to exist in the aqueous phase of the melted butter proximate the interface, while other components of the "interfacial butter solids", such as phospholipids, tend to exist proximate the interface of the fat phase and the aqueous phase of the melted butter in both the fat phase and the aqueous phase of the melted butter.

Consequently, the "interfacial butter solids" includes those solid particles and/or semi-solid particles that tend to congregate proximate the interface of the aqueous phase and the fat phase of the melted butter under the influence of gravity or physical separation, no matter whether those solid particles and/or semi-solid particles are in the aqueous phase, the liquid phase, or both the aqueous phase and the liquid phase of the melted butter. Additionally, solid particles and/or semi-solid particles of the interfacial butter solids may be dissolved (solubilized) in the aqueous phase and/or the fat phase of the melted butter.

The term "interfacial butter solids" includes all solid particles and/or semi-solid particles that tend to congregate proximate the interface of the aqueous phase and fat phase of melted butter, rather than only solid particles and/or semi-solid particles that actually have congregated proximate the interface of the aqueous phase and the fat phase of melted butter. The term "interfacial butter solids" excludes any non-dairy additives, such as salt, that are added to the milk and/or cream that is processed to form the butter and also excludes any non-dairy additives that are added to the milk and/or cream during the butter production process or that are added to the butter after the butter production process. The term "interfacial butter solids" also excludes any non-dairy fat that is added to the milk and/or cream that is processed to form the butter, any non-dairy fat that is added to the milk and/or cream during the butter production process, and any non-dairy fat that is added to the butter after the butter production process. Additionally, unless otherwise-indicated, the term "non-dairy" means not a dairy material and not derived from a dairy material. Milk cream, whey, cheese, and butter are some non-exhaustive examples of dairy materials.

As noted, some components of the "interfacial butter solids", such as proteins and sugars, tend to exist in the aqueous phase of the melted butter proximate the interface. Therefore, these protein and sugar components of the interfacial butter solids will predominantly, if not nearly exclusively, remain in the aqueous phase upon separation of the aqueous phase from the melted butter. Also as noted, other components of the "interfacial butter solids", such as phospholipids, tend to exist proximate the interface of the fat phase and the aqueous phase of the melted butter with part of each phospholipid molecule typically located in the aqueous phase of the melted butter and with another part of each phospholipid molecule typically located in the fat phase of the melted butter. Nonetheless, upon removal of the aqueous phase from melted butter, most, if not essentially all, of the phospholipids tend to stay with the aqueous phase; this tendency of the phospholipids to stay with the aqueous phase instead of with the fat phase upon removal of the aqueous phase from the melted butter is believed to occur because the attraction of each phospholipid molecule portion present in the aqueous phase to the aqueous phase tends to be stronger than the attraction of each corresponding phospholipid molecule portion present in the fat phase is to the fat phase. Despite this observation, when separating the aqueous phase and the fat phase of the reduced water content material 26 into the butterfat 30, the byproduct butterfat 31, and the butter solids intermediate 32, some butterfat may be allowed to stay with the aqueous phase (butter solids intermediate 32) to maximize the amount of the phospholipid component of the interfacial butter solids that remains in the butter solids intermediate 32.

Additionally, unless otherwise indicated, all references to "butterfat" are to be understood as referring to dairy (milk) fat that is both (1) present in butter and (2) present in the liquid dairy material, such as milk, cream, or combination of milk and cream, that is processed to form the butter. Consequently, unless otherwise indicated, the term "butterfat" excludes non-dairy fats, including, but not limited to, any non-dairy fat that is added to, or as, feed components of the butter production process; any non-dairy fat that is added to the butter production process during butter manufacture; and any non-dairy fat that is added to the butter after the butter production process.

The feed material 12 preferably contains, and more preferably consists of, butter that is recognized as butter in the United States by regulatory authorities, such as the Department of Agriculture (U.S.D.A). The U.S.D.A. defines butter as follows:

The food product usually known as butter, and which is made exclusively from milk or cream, or both, with or without additional coloring matter, and containing not less than 80 percent by weight of milkfat, all tolerances having been allowed for.

7 C.P.R §58.305(a), revised Jan. 1, 1997. Generally, however, the feed material 12 may contain or may consist of any butter, such as butter formed by churning. This means that butter present in the feed material 12 will typically have a butterfat concentration of at least about 60 weight percent, based on the total weight of the butter leaving the butter production process, since the aggregation of milk fat molecules into the "butterfat" matrix that entraps water molecules will typically not form if the milk fat concentration of the in-process dairy material that is transformed into butter is less than about 60 weight percent, based on the total weight of the in-process dairy material.

For purposes of marketing the butter solids intermediate 32 (as concentrated liquid butter), the intermediate blend 46, (he liquid butter/margarine blend 52, and/or the solidified butter/margarine blend 56 to American consumers, the butter that forms, or is part of, the feed material 12 is preferably based upon dairy material that is produced by or derived from dairy cattle in the United States, since the palates of American consumers are accustomed to dairy material that is produced by or derived from dairy cattle in the United States. Dairy animals, such as dairy cattle, in other regions of the world are often fed or grazed upon different feeds than dairy cattle in the United States. For example, dairy cattle in New Zealand are typically grazed on clover which gives butter a unique flavor that is typically not appreciated by American consumers.

For purposes of marketing the butter solids intermediate 32 (as concentrated liquid butter), the intermediate blend 46, the liquid butter/margarine blend 52, and/or the solidified butter/margarine blend 56 to consumers in countries other than the United States, the butter that forms, or is part of, the feed material 12 may be based upon dairy material that is produced by or derived from dairy cattle in countries other than the United States, while realizing that consumers in a particular country will typically prefer dairy products that are based upon dairy material produced by or derived from dairy cattle in that particular country.

The time between formation of the butter and introduction of the butter into the process 10 as the feed material 12 or as a component of the feed material 12 is preferably minimized to maximize the "fresh churned" butter taste of products produced in accordance with the present invention. Though not wishing to be bound by theory, it is believed that air entrained in butter during the churning process causes or contributes to degradation of flavor components in freshly-churned butter that are responsible for the difference between the taste of freshly churned butter and the taste of butter that can no longer be considered to be fresh churned.

Therefore, the butter that forms, or is part of, the feed material 12 is preferably freshly churned butter that has been produced no more than about 8 hours prior to being incorporated in the process 10. In one particularly preferred embodiment, the butter that forms, or is part of, the feed material 12 is introduced into the process 10 in semi-solid form directly from the churning process to minimize the time between formation of the butter and feeding of the butter to the process to as the feed material 12 or as a component of the feed material 12.

Additionally, in the process 10, the feed material 12, the liquid feed material 16, the mixed liquid feed material 20, the reduced water-content material 26, the butterfat 30, the byproduct butterfat 31, the butter solids intermediate 32, the intermediate blend 46, the liquid butter/margarine blend 52, the solidified butter/margarine blend 56, the packaged butter/margarine blend 60, and derivatives of any of these are each preferably handled carefully in the process 10 to minimize damage to these streams or to any components of these streams. Careful handling entails minimizing, and preferably eliminating, exposure of these streams to temperatures above about 160° F. (above about 71.1° C.). Though the mixed liquid feed material 20 may be exposed to a temperature of about 200° F. (about 93.3° C.) to about 210° F. (about 98.9° C.) prior to and immediately after entering the evaporator 22, this high temperature exposure is brief, since the material 20 rapidly cools to approximately 140° F. (approximately 60° C.), or less, soon after entering the evaporator 22. Also, all processing and handling of these streams in the process 10 is preferably done under conditions that minimize the potential for oxidation of these streams, or of components of these streams, such as by blanketing these streams with an inert gas, such as nitrogen. Furthermore, transfer of these streams within the process 10 is preferably accomplished using a positive displacement pump, such as a lobe-type pump or a high pressure piston pump of the type typically used in dairy homogenizers.

Although the feed material 12 preferably consists of only butter, the feed material 12 may permissibly include one or more other materials in addition to butter. When other material(s) in addition to butter are included in the feed material 12, the concentration of butter in the feed material 12 is preferably at least about 50 weight percent, more preferably at least about 75 weight percent, and still more preferably at least about 90 weight percent, based on the total weight of the feed material 12. Butter is preferably the major, more preferably the predominant, and most preferably the only component of the feed material 12, since the interfacial butter solids that are present in butter and that are concentrated in accordance with the present invention provide the desirable, enhanced baking, flavor, and mouth-feel properties that are achieved in products that are produced in accordance with the present invention.

Nonetheless, in place of some or all of the butter, the feed material 12 may optionally include any butter material that is derived from butter, so long as the butter material includes interfacial butler solids. In addition to interfacial butter solids, the optional butter material may optionally also include butterfat, water, or any combination of water and butterfat in any concentration. Also, in addition to butter and the optional butter material, the feed material 12 may permissibly, though preferably does not, include any edible non-dairy fat, such as lard, beef tallow, vegetable oil, and/or shortening; water, any food grade coloring agent(s); any food grade emulsifying agent(s) such as lecithin, a monoglyceride, or a diglyceride; or any combination of any of these. Added food grade emulsifying agent(s) are preferably not included with the butter in the feed material 12, since the presence of added food grade emulsifying agents in the feed material 12, under some operating conditions, may complicate removal of water via the evaporator 22 and/or separation of the butterfat 30 and byproduct butterfat 31 from the butter solids intermediate 32 in the separator 28.

If the optional butter material is included in the feed material 12, the interfacial butter solids concentration in the butter material is preferably about the same as the concentration of interfacial butter solids in the butter that is used as part of the feed material 12. This preference is based upon the fact that centrifugal separation equipment that may be used as the separator 28, at some operating conditions, has been found to sometimes lose some amount of interfacial butter solid during U.S.D.A. mandated "burping" of the centrifugal separation equipment. It is believed that the interfacial butter solids losses from the centrifugal separator will tend to increase, as a percentage of the total interfacial butter solids in the feed material 12, as the concentration of interfacial butter solids increases in the feed material 12. Thus, while it is entirely desirable to have interfacial butter solids in the feed material 12, the concentration of interfacial butter solids included in the optional butter material is preferably about the same as the concentration of interfacial butter solids in the butter of the feed material 12 to avoid enhancing the relative amount of interfacial butter solids lost due to U.S.D.A.-mandated burping of any centrifugal separator that is used as the separator 28.

Likewise, the content of solids other than interfacial butter solids in the feed material 12 is preferably minimized to minimize loss of interfacial butter solids during the U.S.D.A.-mandated burping of any centrifugal separator used as the separator 28. For this reason, and to minimize the potential for corrosion in the evaporator 22, the butter that is used in or as the feed material 12 is preferably unsalted butter, since any desired salt may be added later in the process 10 to the tank 36.

Furthermore, the feed material 12 preferably does not include any edible non-dairy fat, since addition of non-dairy fat as part of the feed material 12 would increase the expense and the amount of work needed to concentrate the interfacial butter solids using the evaporator 22 and the separator 28. Also, any non-dairy fat added as part of the feed material 12 would diminish the market value of any byproduct butterfat 31 and any butterfat 30 that is removed from the holding tank 24 as by-product, rather than being used as butterfat 38 that is added to the tank 42. Likewise, the feed material 12 preferably does not include any added water beyond water present in the aqueous phase of butter, since addition of extra water as part of the feed material 12 would also increase the expense and the amount of work needed to concentrate the interfacial butter solids using the evaporator 22.

Additionally, the feed material 12 preferably does not include any food grade emulsifying agent(s), since it has been found that the interfacial butter solids from the feed material 12 typically supply most, if not all, of the blending power necessary to form a stable water-in-fat matrix in the concentrated liquid butter, the intermediate blend 46, the liquid butter/margarine blend 52, and the solidified butter/margarine blend 56 that may be produced in accordance with the present invention. This observation about the interfacial butter solids from the feed material 12 typically supplying most, if not all, of the blending power necessary to form a stable water-in-fat matrix depends upon at least the following factors: (1) the concentrations of interfacial butter solids in the butterfat 38 and in the butter solids intermediate 40, (2) the ratio of the butterfat 38, the butter solids intermediate 40, and the optional non-dairy fat 44 to each other in the intermediate blend 46, (3) the nature of the non-dairy fat 44, (4) the fat profile of the butterfat 38 or of the blend of the butterfat 38 and any optional non-dry fat 44 and (5) mixing conditions (such as mixing severity and component temperatures) in the tank 42. Ultimately, food grade emulsifying agent(s) are preferably not added during processing of the feed material 12, and derivatives thereof, in accordance with the present invention, such as in the process 10, though it is nevertheless permissible to include emulsifying agent(s) as an additive to the butterfat 30 in the tank 34 or as a component of the additive(s) 48.

The tank 18 in the process 10 functions as an accumulation tank for the liquid feed material 16 and balances differences between the flow rate of the feed material 12 and the flow rate of the mixed liquid feed material 20. When the tank 18 is included in the process 10, the liquid feed material 16 is subjected to mild agitation, only, in the tank 18 that is sufficient to prevent stratification of components of the liquid feed material 16 and thereby avoid significant variations in the composition of the mixed liquid feed material 20 that is sent to the evaporator 22. As yet another alterative, the tank 18 may be left out of the process 10 in favor of a balance tank for the feed material 12, prior to heating of the feed material 12.

Preferably, however, the feed material 12 balance tank or the tank 18 is included to provide an option of returning a portion of the reduced-water content material 26, a portion of the butterfat 30, and/or a portion of the byproduct butterfat 31 to the feed material 12 balance tank or the tank 18 for subsequent reflux in the evaporator 22 to enhance flavor development in the light butter 62. As discussed more fully below, it is believed that hydrolytic and/or hydrolysis reactions occurring during reflux contact between the butterfat and aqueous components in the evaporator 22 may enhance flavor development in the liquid butter/margarine blend 52 and derivatives thereof.

The evaporator 22 may be or include any type of evaporation equipment, such as a vacuum can, a triple effect evaporator, a vacuum distillation tower, or any combination of any of these, that is capable of removing water 24 from the mixed liquid feed material 20. Preferably, the evaporator 22 allows components that are present in the mixed liquid feed material 20 to quickly cool to about 140° F., or less, soon after these components enter the evaporator 22 to minimize degradation of these components that become part of the reduced water-content material 26. As one non-exhaustive example, the evaporator 22 may consist of one or more vacuum cans (not shown) arranged either in series or in parallel, where a vacuum is created in the vacuum can(s) by a vacuum source, such as a vacuum pump. One suitable example of the evaporator 22 is a SENIOR™ vacuum chamber that is available from Kussel Equipment Company of Watertown, Wis. An ELMO®-P vacuum pump that may be obtained from Siemens Aktiengesellschaft of Munich, Germany may be used as the vacuum source for the SENIOR™ vacuum chamber.

Water 24 may be sequentially removed by multiple passes through the evaporator 22 or may be removed in one pass through the evaporator 22 by permitting a longer residence time of the mixed liquid feed material 20 in the evaporator 22. The purpose of removing water 24 in the evaporator 22 is to concentrate the interfacial butter solids of the butter that is used in or as the feed material 12. Therefore, the evaporator 22 preferably removes water 24 from the mixed liquid feed material 20 without removing any interfacial butter solids from the mixed liquid feed material 20.

Any technique that is capable of removing water from the feed material 12 or the mixed liquid feed material 20 maybe substituted in place of the evaporator 22, so long as the technique is capable of minimizing, and preferably eliminating, removal of interfacial butter solids from the feed material 12 or from the mixed liquid feed material 20. For example, as an alternative to the evaporator 22, the feed material 12 or the mixed liquid feed material 20 may be subjected to freeze drying or spray drying to reduce the concentration of water in the feed material 12 or in the mixed liquid feed material 20. However, the process 10 preferably employs the evaporator 22 instead of freeze drying, since water removal using the evaporator 22 is less complicated than freeze drying and relies on equipment conventionally used in the dairy industry for water removal. Also, the process 10 preferably employs the evaporator 22 instead of spray drying, since spray drying would be excepted to cause undesirable oxidation of one or more components of the mixed liquid feed material 20.

The separator 28 may be any piece of equipment (not shown), such as gravity separation equipment (a settling tank, for example) or mechanical separation equipment (a centrifuge, for example), that permits the aqueous phase and the butterfat phase of the butter to separate into substantially distinct layers and thereby permits separation of the reduced water-content material 26 into the butterfat 30, the byproduct butterfat 31, and the butter solids intermediate 32. The butterfat 30 and the byproduct butterfat 31 primarily contain butterfat. The butterfat and the byproduct butterfat 31 may also contain a small amount of aqueous phase material of the type that forms the majority of the butter solids intermediate 32, though the amount of aqueous phase material in the butterfat 30 and the byproduct butterfat 31 is preferably minimized. The butter solids intermediate 32 primarily contains water and water-soluble components along with the majority of the interfacial butter solids. The butter solids intermediate 32 may also contain a small amount of butterfat and butterfat-soluble components to maximize capture of interfacial butter solids, such as phospholipids, in the butter solids intermediate 32, though the amount of butterfat in the butter solids intermediate 32 is preferably minimized to a degree that is consistent with maximizing recovery of interfacial butter solids, such as phospholipids, in the butter solids intermediate 32.

Furthermore, multiple pieces of equipment may be provided that collectively operate as the separator 28. For example, the separator 28 may include a pair of settling tanks (not shown) that are arranged in series. In one of the tanks, the reduced water-content material 26 may be separated into a butterfat component (not shown) and the butter solids intermediate 32. Thereafter, the butterfat component may be separated into the butterfat 30 and the byproduct butterfat 31. Of course, alternative separation equipment, such as a centrifuge, may be substituted in place of one or both of these tanks.

Preferably, stratification of the butterfat phase and the aqueous phase of the butter occurs in the separator 28 to a substantial degree to maximize separation of butterfat 30 and interfacial butter solids in the separator 28. When the separator 28 is a gravity separator, such as a settling tank, it has been determined that operating temperatures above about 145° F. (above about 62.8° C.) in the separator 28 tend to reduce separation efficiency and consequently may cause undesirably high amounts of interfacial butter solids to be retained in the butterfat and/or the byproduct butterfat 31.

One example of a suitable piece of equipment that may serve as the separator 28 or as a component of the separator 28 is the BMRPX-S314 centrifuge that may be obtained from Alfa-Laval Separation, Inc. of Warminster, Pa. The BMRPX-S314 centrifuge may have a bowl speed of about 5,000 revolutions per minute (rpm), though the bowl is preferably powered by a variable speed drive that permits adjustment of the bowl speed to minimize, and preferably eliminate, loss of interfacial butter solids due to the aforementioned U.S.D.A.-mandated "burping" of the separator 28. For the BMRPX-S314 centrifuge, the top of the separator bowl is preferably maintained at a temperature above the melting point of butter, using a warm water bath, to prevent butterfat from solidifying and plugging the outlet for the aqueous phase (intermediate butte solids 32). If any clumps of solidified butterfat begin to form in the BMRPX-S314 centrifuge, these clumps may plug the outlet for the aqueous phase and cause loss of some of the aqueous phase (intermediate butte solids 32), and thus loss of some of the interfacial butter solids, to the butterfat 30 and/or the byproduct butterfat 31.

As a general guideline, the degree of interfacial butter solids separation into the butter solids intermediate 32 versus interfacial butter solids separation into the butterfat 30 and/or the byproduct butterfat 31 may be gauged by the visual clarity of the butterfat 30 and/or the byproduct butterfat 31. If the butterfat 30 and/or the byproduct butterfat 31 are cloudy in appearance, it is likely that a significant amount of the interfacial butter solids has wound up in the butterfat 30 and/or the byproduct butterfat 31, as opposed to the butter solids intermediate 32. On the other hand, if the butterfat 30 and/or the byproduct butterfat 31 are each fairly clear (though colored) in appearance, most, if not all or predominantly all, of the interfacial butter solids have been separated into the butter solids intermediate 32, as opposed to the butterfat 30 and/or the byproduct butterfat 31.

The purpose of the separator 28 is to permit splitting of the reduced water-content material 26 into the butterfat 30, the byproduct butterfat 31, and the butter solids intermediate 32. Operation of the separator 28 preferably maximizes the concentration of interfacial butter solids in the butter solids intermediate 32 and minimizes the concentration of interfacial butter solids in the butterfat 30 and in the byproduct butterfat 31. More preferably, the butter solids intermediate 32 that is discharged from the separator 28 contains at least about 95 weight percent, or more, of the interfacial butter solids originally present in the feed material 12, and the butterfat 30 and the byproduct butterfat 31 that exit the separator 28 collectively contain little, if any, of the interfacial butter solids, such as about 5 weight percent, or less, of the interfacial butter solids originally present in the feed material 12.

Still more preferably, the separator 28 causes the butter solids intermediate 32 to contain at least about 99 weight percent, or more, of the interfacial butter solids originally present in the feed material 12 and causes about 1 weight percent, or less, of the interfacial butter solids originally present in the feed material 12 to be in the butterfat 30 and in the byproduct butterfat 31, collectively, that exit the separator 28. Most preferably, operation of the separator 28 causes all of the interfacial butter solids originally present in the feed material 12 to be in the butter solids intermediate 32 and yields butterfat 30 and byproduct butterfat 31 that contain no or only de minimis amounts of interfacial butter solids.

The interfacial butter solids are predominantly formed of proteins, sugars (predominantly lactose), and phospholipids. Consequently, unless otherwise indicated, all comments and statements that are provided herein about interfacial butter solids are equally applicable to proteins, sugars, and phospholipids, collectively. Thus, as another gauge of the degree of separation of the interfacial butter solids into the butter solids intermediate 32, as opposed to the butterfat 30 and/or the byproduct butterfat 31, one may rely on degree of separation of proteins, sugars, and phospholipids into the butter solids intermediate 32 versus the degree of separation of proteins, sugars, and phospholipids into the butterfat 30 and/or the byproduct butterfat 31. The amount and concentration of proteins and sugars in a particular sample, such as the butter solids intermediate 32, the butterfat 30, or the byproduct butterfat 31, may be determined using the Solids Non-Fat determination procedure that is provided below in the PROPERTY ANALYSIS AND CHARACTERIZATION PROCEDURE section of this document. Likewise, the amount and concentration of phospholipids in a particular sample, such as the butter solids intermediate 32, the butterfat 30, or the byproduct butterfat 31, may be determined using the Phospholipids determination procedure that is provided below in the PROPERTY ANALYSIS AND CHARACTERIZATION PROCEDURE section of this document. The results obtained from the Solids Non-Fat determination procedure and from the Phospholipids determination procedure may be combined to determine the amount and concentration of proteins, sugars, and phospholipids, collectively, in a particular sample, such as the butter solids intermediate 32, the butterfat 30, or the byproduct butterfat 31.

Operation of the separator 28 preferably maximizes the concentration of proteins, sugars, and phospholipids, collectively, in the butter solids intermediate 32 and minimizes the concentration of proteins, sugars, and phospholipids, collectively, in the butterfat 30 and in the byproduct butterfat 31. More preferably, the butter solids intermediate 32 that is discharged from the separator 28 contains at least about 95 weight percent, or more, of the proteins, sugars, and phospholipids, collectively, that were originally present in the feed material 12, and the butterfat 30 and the byproduct butterfat 31 that exit the separator 28 collectively contain little, if any, of the proteins, sugars, and phospholipids, such as about 5 weight percent, or less, collectively of the proteins, sugars, and phospholipids originally present in the feed material 12.

Still more preferably, the separator 28 causes the butter solids intermediate 32 to contain at least about 99 weight percent, or more, of the proteins, sugars, and phospholipids, collectively, that were originally present in the feed material 12 and causes about 1 weight percent, or less, of the proteins, sugars, and phospholipids, collectively, that were originally present in the feed material 12 to be in the butterfat 30 and in the byproduct butterfat 31, collectively, that exit the separator 28. Most preferably, operation of the separator 28 causes all of the proteins, sugars, and phospholipids originally present in the feed material 12 to be in the butter solids intermediate 32 and yields butterfat 30 and byproduct butterfat 31 that contain no or only de minimis amounts of proteins, sugars, and phospholipids.

The purpose of removing water 24 in the evaporator 22 and removing the butterfat 30 and the byproduct butterfat 31 in the separator 28 is to maximize the concentration of interfacial butler solids in the butter solids intermediate 32. The butter solids intermediate 32 serves as a building block for creating products that have a higher concentration of interfacial butter solids than ordinarily present in butter. Some of the butterfat 30, some optional non-dairy fat 44, and some optional aqueous-phase material may be combined with the butter solids intermediate 32 to attain products having an elevated concentration of interfacial butter solids, a desired butterfat content, a desired non-dairy fat concentration, as well as, a desired fat profile.

Ultimately, a major goal of the interfacial butter solids in the butter solids intermediate 32 via the process 10 is to permit preparation of butter-based products, such as butter and/or the butter/margarine blend, that have an enhanced concentration of interfacial butter solids, as compared to the concentration of interfacial butter solids ordinarily present in butter. This enhancement of the interfacial butter solids content in butter and/or butter/margarine blends that may be produced according to the present invention causes the produced butter and/or butter/margarine blends to have improved butter taste and butter-baking characteristics, even as compared to the butter that forms all or part of the feed material 12.

To maximize the recovery of interfacial butter solids in the butter solids intermediate 32, some water may be, and typically is, allowed to remain in the reduced water-content material 26 that leaves the evaporator 22, and some butterfat maybe allowed to remain in the butter solids intermediate 32 that exits the separator 28. Permitting some water to remain in the reduced water-content material 26 typically helps to minimize, or even eliminate, losses of interfacial butter solids via the water 24 that exits the evaporator 22 and via the butterfat 30 and the byproduct butterfat 31 that exit the separator 28, respectively. Likewise, permitting a small amount of butterfat to remain in the butter solids intermediate 32 may help to minimize, or even eliminate, losses of interfacial butter solids via the butterfat 30 and the byproduct butterfat 31 that exit the separator 28, respectively.

Also, water 24 may optionally be removed without removing any butterfat 30 and/or any byproduct butterfat 31, or butterfat 30 and/or byproduct butterfat 31 may be removed without removing any water 24, if desired, to attain particular properties in the butter solids intermediate 32 (as concentrated butter), the intermediate blend 46, the liquid/margarine blend 52, and/or the solidified butter/margarine blend 56. However, the concentration of water and the concentration of butterfat in the butter solids intermediate 32 is preferably minimized, to the extent possible, consistent with the goal of preferably maximizing the amount of interfacial butter solids retained in the butter solids intermediate 32 versus the amount of interfacial butter solids originally present in the feed material 12. Furthermore, if butterfat 30 and/or byproduct butterfat 31 are removed without removing any water 24, addition of the optional emulsifying agent(s) may be required to obtain the desired water-in-fat dispersion of the intermediate blend 46 and the liquid butter/margarine blend 52.

Though the separator 28 is depicted as being located after the evaporator 22 in the process 10, some or all removal of the butterfat 30 and/or the byproduct butterfat 31 may optionally occur prior to water 24 removal. This scenario would offer the advantage of reducing the amount of fluid needing to be heated to evaporate the water 24 in the evaporator 22. However, it is presently believed that evaporation of the water 24 prior to any butterfat 30 removal and any byproduct butterfat 31 may cause some added flavor development as a result of short chain fatty acid cleavage from hydrolytic and/or hydrolysis reactions occurring during reflux contact between the butterfat and aqueous components of the feed material 10 in the evaporator 22 It is thought that the short chain fatty acids resulting from this cleavage may add to the potent flavor profile realized in butter and butter/margarine blends produced according to the present invention. Therefore, based upon this present understanding, it is preferred that most, and more preferably all, butterfat 30 removal and/or byproduct butterfat 31 removal occurs after water 24 removal.

After the reduced water-content material 26 has been split into the butterfat 30, the byproduct butterfat 31, and the butter solids intermediate 32, the butterfat 30 is placed into the holding tank 34, which primarily functions as an accumulation tank. The composition of the butterfat 30 is typically not modified in the holding tank 34 and nothing is typically combined with the butterfat 30 in the holding tank 34. The holding tank 34 is preferably jacketed and equipped with a temperature controller to permit heating and/or cooling of the tank 34 contents and consequent maintenance of the butterfat 30 in the tank 34 as a liquid in a desired temperature range, such as at a temperature in the range of about 105° F. (about 40.6° C.) to about 120° F. (about 48.9° C.).

After the reduced water-content material 26 has been split into the butterfat 30, the byproduct butterfat 31, and the butter solids intermediate 32, the butter solids intermediate 32 is placed into the holding tank 36, which primarily functions as an accumulation tank. The holding tank 36 is preferably jacketed and equipped with a temperature controller to permit heating and/or cooling of the tank 36 contents and consequent maintenance of any butterfat content of the butter solids intermediate 32 in the tank 36 as a liquid at an appropriate temperature, such as at a temperature in the range of about 105° F. (about 40.6° C.) to about 120° F. (about 48.9° C.).

The composition of the butter solids intermediate 32 is typically not modified in the holding tank 36 and nothing is typically combined with the butter solids intermediate 32 in the holding tank 36. Nonetheless, salt may optionally be added to, and dispersed within, the butter solids intermediate 32 in the tank 36 to give the subsequently prepared intermediate blend 46 a desired salt content that is typically in the range of about 1.2 weight percent salt to about 1.8 weight percent salt, based on the total weight of the intermediate blend 46. The salt maybe any food-grade salt, such as sodium chloride. The optional salt is preferably added as part of an aqueous salt slurry to assist in homogeneously dispersing the salt within the butter solids intermediate 32.

After separation of the water 24, the butterfat 30, and/or the byproduct butterfat 31 in the process 10, the butterfat 38, the butter solids intermediate 40, and the optional non-dairy fat 44 may be selectively metered, in batch wise fashion, into the weigh and mix tank 42 at any ratio relative to each other. The relative amounts of butterfat 38, butter solids intermediate 40, and non-dairy fat 44 that are added to the weigh and mix tank 42 maybe adjusted as desired to selectively attain desired properties in butter and butter-based products produced using the process 10. Preferably, however, the relative amounts of butterfat 38, butter solids intermediate 40, and non-dairy fat 44 are selected to increase the concentration of interfacial butter solids in the liquid butter/margarine blend 52, relative to the concentration of interfacial butter solids in the butter used as, or as part of the feed material 12.

The butterfat 38, the butter solids intermediate 40, and the optional non-dairy fat 44 are preferably added to the tank 42 in a particular sequence to avoid the potential of forming a fat-in-water emulsion since, absent proper sequencing, formation of a fat-in-water emulsion may occur even at high liquid fat concentrations of 80 weight percent, or more, and low moisture concentrations of 20 weight percent, or even less. To form the desired water-in-fat dispersion, rather than the undesired fat-in-water emulsion, the butterfat 38 and the optional non-dairy fat 44 are preferably added to the tank 42 and placed at an appropriate temperature, such as within the range of about 105° F. (about 40.6° C.) to about 120° F. (about 48.9° C.), to maintain the butterfat 38 and any warm, optional non-dairy fat 44 as liquids. The agitator (not shown) in the tank 42 is activated to homogeneously mix the warm butterfat 38 and the optional non-dairy fat 44. With the agitator still activated, the butter solids intermediate 40 is then preferably added to the mixture of the butterfat 38 and the optional non-dairy fat 44, under high shear agitation, to form the intermediate blend 46. The butter solids intermediate 40 addition rate should be slow enough and the mixing conditions in the tank 42 should be aggressive enough to cause formation of the intermediate blend 46 as the water-in-fat dispersion, preferably with the preferred continuous liquid fat phase.

The temperatures of the butterfat 38, the optional non-dairy fat 44, and the butter solids intermediate 40 may be selected to achieve a mixture temperature in the tank 42 of about 105° F. (about 40.6° C.) to about 120° F. (about 48.9° C.) unless precrystalization of some fat is desired in the intermediate blend 46. Maintaining a lower temperature in each tank 42 on the order of about 80° F. (about 26.7° C.) to about 92° F. (about 33.3° C.) will typically cause a small amount of crystallizable fat in the intermediate blend 46 to be precrystalized as solid fat crystals in the continuous fat phase of the intermediate blend 46. When such precrystallization is desired, the solid fat crystals preferably form to a degree in the continuous fat phase of the intermediate blend 46 that increases the viscosity of the continuous fat phase and consequently permits the continuous fat phase to hinder, and more preferably eliminate, coalescence of aqueous droplets. The precrystalized fat acts as nuclei that promote an increased rate of crystallization in the crystallization equipment, such as the swept surface heat exchanger 54. Alternatively, the intermediate blend 46 containing precrystalized fat, after passing through the blend tank 50, may be placed in tote or barrel packages for subsequent quiescent crystallization.

The butterfat 38, the optional non-dairy fat, and the butter solids intermediate 40 that are added to the tank 42 are each heated to temperatures that, upon addition of the butter solids intermediate 42 to either the butterfat 38 or the fat blend of the butterfat 38 and the optional non-dairy fat 44, (1) will permit uniform dispersion of the butter solids intermediate 40 in the butterfat 38 or in the fat blend and (2) will cause formation of the intermediate blend 46 as the stable water-in-fat dispersion that is preferably based on the continuous fat phase. When precrystalization in the intermediate blend 46 is desired, the two objectives noted above along with the desired precrystalization may typically be achieved with the butterfat 38 or the fat blend at a temperature ranging from about 110° F. (about 43.3° C.) to about 125° F. (about 51.7° C.) and with the butter solids intermediate 40 at a temperature ranging from about 60° F. (about 15.6° C.) to about 80° F. (about 26.7° C.). Mixing the butterfat 38 or the fat blend and the butter solids intermediate 40 that are within these temperature ranges will typically yield the intermediate blend 46 at a temperature ranging from about 80° F. (about 26.7° C.) to about 92° F. (about 33.3° C.) at typical blend ratios of the butterfat 38 or the fat blend to the butter solids intermediate 40. When precrystalization in the intermediate blend 46 is not desired, the two objectives noted above along with the desired lack of precrystalization may typically be achieved with the butterfat 38 or the fat blend at a temperature ranging from about 120° F. (about 48.9° C.) to about 140° F. (about 60° C.) and with the butter solids intermediate 40 at a temperature ranging from about 100° F. (about 37.8° C.) to about 120° F. (about 48.9° C.). Mixing the butterfat 38 or the fat blend and the butter solids intermediate 40 that are within these temperature ranges will typically yield the intermediate blend 46 at a temperature ranging from about 105° F. (about 40.6° C.) to about 120° F. (about 48.9° C.) at typical blend ratios of the butterfat 38 or the fat blend to the butter solids intermediate 40.

Of course, the exact temperatures selected for the butter solids intermediate 40, the butterfat 38 or the fat blend of the butterfat 38, and the optional non-dairy fat 44, respectively, to achieve (1) uniform dispersion of the butter solids intermediate 40 in the butterfat 38 or in the fat blend and (2) formation of the intermediate blend 46 as the stable water-in-fat dispersion depend upon at least the following factors: (1) the concentration of interfacial butter solids in the butterfat 38 and in the butter solids intermediate 40, (2) the ratio of the butterfat 38, the butter solids intermediate 40, and the optional non-dairy fat 44 to each other in the intermediate blend 46, (3) the nature of the non-dairy fat 44, (4) the fat profile of butterfat 38 or of the blend of the butterfat 38 and any optional non-dairy fat 44, (5) mixing conditions (such as mixing severity and component temperatures) in the tank 42, and (6) the concentration of any optional emulsifying agent in the butterfat 38 or in the fat blend.

The weigh and mix tank 42 is preferably jacketed to permit heating and cooling of the tank 42 to attain and maintain a desired temperature of components that are added to, and blended together in, the mix tank 42. The process 10 may include a plurality of the tanks 42 that are arranged in parallel with each other. This permits filling and mixing to occur in one of the tanks 42 while the contents of another of the tanks 42 are being transferred to the blend tank 50 for further processing. In one embodiment, each tank 42 has a capacity of about 600 gallons (about 2271 liters) and includes a center post agitator with agitation enhancement baffles that are attached within the tank. Any conventional agitation mechanism may be employed in each tank 42, so long as mixing that is adequate to insure creation of the desired water-in-fat dispersion may occur in each tank 42. Additionally, each tank 42 preferably has a slanted, cone-shaped bottom to permit complete emptying of the tank(s) 42. One suitable example of the tank(s) 42 is the WPDA (600 gallon/2271 liter capacity) process tank that is available from Waukesha Chery-Burrell of Delavan, Wis.

For the purpose of modifying the fat profile of the intermediate blend 46, the optional non-dairy fat 44 may be substituted in the weigh and mix tank 42 for some of the butterfat 38 that would ordinarily be added to attain a particular concentration of fat in the intermediate blend 46. Thus, in addition to creating a product with an increased concentration of interfacial butter solids, as compared to the concentration of interfacial butter solids ordinarily present in butter, the process 10 may also be utilized to change the fat profile in the product from the fat profile originally present in the butter of the feed material 12. Some non-exhaustive examples of suitable non-dairy fats 44 include animal fats, such as lard and beef tallow; plant fats, such as shortening, vegetable oil, and tropical oils; marine oils, such as kelp oil and seaweed oil; fish oil, such as menhaden oil; and any of these in any combination Some non-exhaustive examples of suitable vegetable oils include corn oil, peanut oil, soybean oil, canola oil, olive oil, and any of these in any combination. Some non-exhaustive examples of suitable tropical oils include coconut oil, palm oil, palm kernel oil, and any of these in any combination.

Any of the components of the non-dairy fat 44, if normally in the liquid phase at a particular temperature, may be hydrogenated to harden the non-dairy fat 44 and thereby modify the viscosity and phase of the non-dairy fat 44, as desired. Furthermore, the non-dairy fat 44 may be selected to achieve desired properties in the liquid butter/margarine blend 52 and in the solidified butter/margarine blend 56. For example, the non-dairy fat 44 may be selected to achieve, upon mixing with the butter solids intermediate 40 and any added butterfat 38 and subsequent processing in the process 10, a particular amount of hardness or softness in the solidified butter/margarine blend 56 or to permit the liquid butter/margarine blend 52 to serve as the final product of the process 10. Thus, after concentrating the interfacial butter solids in the butter solids intermediate 32, the non-dairy fat 44 may be selectively chosen and added to the tank 42 to achieve particular properties in the liquid butter/margarine blend 52 and/or in the solidified butter/margarine blend 56 that are desired by a particular customer or that are more suitable for a particular application of the liquid butter/margarine blend 52 or the solidified butter/margarine blend 56.

Though it is permissible to add non-dairy fat 44 to the butter solids intermediate 40 and any butterfat 38 that is added to the tank 42, it is likewise also permissible to add butter solids intermediate 40 and butterfat 38, without adding any non-dairy fat 44, to the tank 42. This alternative would produce the intermediate blend 46 with a concentrated level of interfacial butter solids, as compared to the concentration of interfacial butter solids in the butter of the feed material 12, while maintaining the original fat profile of the butter of the feed material 12.

Though not depicted, it is permissible to add the non-dairy fat 44 prior to the weigh and mix tank 42. For example, some or all of the non-dairy fat 44 may be included as part of the feed material 12. Preferably, however, the non-dairy fat 44 is not included as part of the feed material 12, since this would increase the volume of the feed material 12 needing to be heated to effect evaporation of the water 24. Also, the non-dairy fat 44 may be added prior to removal of the butterfat 30. However, the non-dairy fat 44 is preferably not added prior to removal of the butterfat 30, since this would increase the size needed for the separator 28 and would make it challenging, if not impossible, to remove byproduct butterfat 31 in the separator 28 without removing any non-dairy fat 44. Removal of a combined fat stream containing both byproduct butterfat 31 and non-dairy fat 44 would typically be expected to diminish the market value of any byproduct butterfat 31. Similar considerations would apply if byproduct butterfat were removed from the butterfat 30 after separation of the butterfat 30 and the butter solids intermediate 32 in the separator 28.

The weigh and mix tank 42 is ordinarily only used for blending the butterfat 38, the butter solids intermediate 40, and the optional non-dairy fat 44. However, it is permissible to add aqueous ingredients and ingredients in aqueous solution at the weigh and mix tank 42, preferably after addition of the butter solids intermediate 40, so that these aqueous ingredients and aqueous solutions of ingredients are incorporated as part of the water-in-fat dispersion that exits the weigh and mix tank 42 as the intermediate blend 46. One example of a suitable aqueous ingredient is water. Some non-exhaustive examples of aqueous solutions of ingredients include sweeteners, such as molasses and malt syrup. Furthermore, small amounts of liquid dairy materials, such as milk, cream, whey, whey protein concentrate, and any combination of any of these, may be added to the weigh and mix tank 42 for incorporation into the water-in-fat dispersion for any desired purpose, such as modifying the viscosity of the water-in-fat dispersion that exits the tank 42 as the intermediate blend 46.

After exiting the weigh and mix tank 42, the intermediate blend 46 is combined with the additive(s) 48 in the blend tank 50. Some non-exhaustive examples of the additive(s) 48 include coloring agent(s); vitamins and minerals, such as Vitamin A and betacarotene; other conventional additives to margarines and fat-based spreads; and any of these in any combination. The additive(s) 48 may include any individual component or any combination of any of the components at any concentration. The combination of the intermediate blend 46 and the additive(s) 48 is subjected to mild agitation in the blend tank 50 to blend the additive(s) 48 into the water-in-fat dispersion (intermediate blend 46) previously formed in the tanks(s) 42.

The blend tank 50 is preferably jacketed and equipped with a temperature controller to permit heating and cooling of the tank 50 and consequent maintenance of the components that are added to, and blended together in, the blend tank 50 at a desired temperature. In the process 10, though only one of the tanks 50 is typically required, two or more of the tanks 50 may be employed if multiple tanks 42 are used, since filling of the tank 50, processing of the components in the tank 50, and emptying of the tank 50 ordinarily takes more time than each cycle of filling the tank 42 and forming the water-in-fat dispersion in the tank 42 that is preparing the next batch for the tank 50. In one embodiment, the tank 50 has the same configuration as the tank 42 and has a capacity of about 600 gallons (about 2271 liters. Therefore, one suitable example of the tank 50 is the WPDA (600 gallon/2271 liter capacity) process tank that is available from Waukesha Cherry-Burrell of Delavan, Wis.

After being formed in the tank 50, the liquid butter/margarine blend 52 may be transferred to the crystallizing equipment, such as the swept surface heat exchanger 54. In the swept surface heat exchanger 54, the liquid butter/margarine blend 52, under heavy mechanical treatment and rapid cooling, is super cooled and crystalized to transform the water-in-fat dispersion created in the tank 42 and maintained in the tank 50 into a water-in-fat matrix and to stabilize and work the water-in-fat matrix. One suitable example of the swept surface heat exchanger 54 is the Votator® 672DE swept surface heat exchanger that is available from Waukesha Cherry-Burrell of Delavan, Wis. Though the swept surface heat exchanger 54 is depicted in the process 10, any equipment, such as a chilled miler type of exchanger, that is capable of supercooling the water-in-fat dispersion from the tank 50 and causing crystallization of fat in the water-in-fat dispersion to form the water-in-fat matrix may be substituted in place of the swept surface heat exchanger 54.

As yet another alternative, the liquid butter/margarine blend 52 may be sent directly to the packing equipment 58, without undergoing the cooling and crystallization in the swept surface heat exchanger 54, in those applications where it is desired for the final packaged product to be in a liquid form. As another example, where the tank 42 has been operated at a lower temperature to attain some precrystalization of fat in the intermediate blend 46, and where this precrystalization has been maintained or enhanced in the tank 50, fat in the liquid butter/margarine blend 52 may be permitted to complete the desired amount of crystallization after being placed in packaging in the packing equipment 58.

The method of the present invention, such as the method utilized in conjunction with the process 10, permits conversion of the feed material 12 that is butter with a certain weight percent Y of interfacial butter solids, based upon the total weight of the butter, into concentrated butter having an interfacial butter solids concentration that has been increased, relative to the concentration of interfacial butter solids originally present in the butter, to any multiple, such as 1.1, 2.0, 2.5, 3.0, 3.5, 4.0, etc., of the Y concentration of interfacial butter solids in the butter of the feed material 12. This is accomplished by removing sufficient water 24 and/or butterfat 30 from the feed 12 followed by addition of a select amount of butterfat 38 and/or non-dairy fat 44 to a select amount of the butter solids intermediate 40 in the weigh and mix tank 42.

Likewise, where the feed material 12 includes one or more components in addition to butter, the method of the present invention, such as the method utilized in conjunction with the process 10, permits conversion of the feed material 12 containing a certain weight percent Z of interfacial butter solids, based upon the total weight of the feed 12, into a butter/margarine blend having an interfacial butter solids concentration that has been increased, relative to the concentration of interfacial butter solids in the feed material 12, to any multiple, such as 1.1, 2.0, 2.5, 3.0, 3.5, 4.0, etc., of the Z concentration of interfacial butter solids in the feed material 12. This is similarly accomplished by removing sufficient water 24 and/or butterfat 30 from the feed material 12 followed by addition of a select amount of butterfat 38 and/or non-dairy fat 44 to a select amount of the butter solids intermediate 40 in the weigh and mix tank 42.

The water 24, the butterfat 30, and the byproduct butterfat 31 may be removed in any ratio, relative to each other, to achieve a desired concentration of the interfacial butter solids in the butter solids intermediate 40. Thereafter, the butter solids intermediate 40 and the butterfat 38 may be blended together in the tank 42 in any ratio that is effective to achieve a desired concentration of the interfacial butter solids in the butter solids intermediate 40 that is preferably greater than the concentration of interfacial butter solids in the feed material 12. Furthermore, if desired, non-dairy fat 44, such as any of the afore-mentioned non-dairy fats, maybe added with the butterfat 38 or substituted in place of some of the butterfat 38 to modify the fat profile of the intermediate blend 46, as compared to the fat profile of the feed material 12.

The net result is that butter-based products, such as concentrated butter and butter/margarine blends, that contain a higher concentration of interfacial butter solids than in the feed material 12 may be produced using the process 10. This is important, because it has been found that the phospholipids portion of the interfacial butter solids enhances the body of baked goods during the baking process and gives the rich characteristic "butter" flavor and mouthfeel to products incorporating the intermediate blend 46 or products derived from the intermediate blend 46, without using any artificial flavoring to simulate the "butter" taste. Indeed, the ability to concentrate the interfacial butter solids in products produced in accordance with the present invention enhances the body yielding capabilities, beyond the enhancement provided by butter alone, during baking and enhances the butter taste and characteristic mouth-feel beyond that contributed by butter alone, prior to processing of the butter in accordance with the present invention.

Furthermore, the protein and lactose components of the interfacial butter solids enhance the browning properties of products that include the interfacial butter solids. Therefore, increasing the interfacial butter solids concentration in the intermediate blend 46 and derivatives of the intermediate blend 46, as compared to the concentration of interfacial butter solids present in butter prior to processing in accordance with the present invention, enhances the browning properties of goods incorporating butter-based products, such as concentrated butter s and butter/margarine blends, that are prepared in accordance with the present invention. Additionally, the ability to modify the fat profile and to likewise control the softness/hardness of butter-based products of the present invention, such as butter/margarine blends, by incorporating the non-dairy fat 44 in place of some of the butterfat originally present in the feed material 12, while concentrating the interfacial butter solids content compared to the original feed material 12, generates innumerable flexible use opportunities for butter-based products, such as concentrated butter s and butter/margarine blends, that are prepared in accordance with the present invention, while retaining the enhanced butter flavor, baking, and browning properties of the butter/margarine blends of the present invention.

Finally, the ability to create butter-based products, such as concentrated butter s and butter/margarine blends, that exclude preservatives and include only natural ingredients, such as butter, salt, natural coloring agents, and natural, non-dairy fat, such as vegetable oil, permits marketers of butter-based products produced in accordance with the present invention to market these butter-based products as natural products having only natural ingredients on the ingredient list. When marketing these improved butter-base products, such as concentrated butter s and butter/margarine blends, there is often no need to include long chemical names for artificial ingredients, emulsifying agents, such as monoglycerides and diglycerides, and preservatives, such as potassium sorbate and sodium benzoate, since the concentrated butter s and butter/margarine blends of the present invention may often be, and preferably are, produced without adding artificial ingredients, such as monoglycerides, diglycerides, potassium sorbate and sodium benzoate.

Property Analysis and Characterization Procedure

Unless otherwise indicated, all determinations of moisture concentration, fat concentration, salt concentration, and solids non-fat concentration are made in accordance with the following procedure. This procedure involves the sequential determination of moisture concentration, then the fat concentration, then the salt concentration, and finally the solids non-fat concentration on a particular sample. Specifically, a weighed sample is first heated to evaporate moisture and then is re-weighed to measure the moisture lost. Then, fat is extracted from the sample using petroleum ether, and the solids remaining in the sample are then re-weighed to determine the fat concentration. Next, the remaining sample is dissolved in hot water and the salt concentration is determined by titration. Finally, the moisture concentration, the fat concentration, and the salt concentration that have been determined for the sample are subtracted from 100% to determine the solids non-fat concentration of the sample. These procedures for moisture concentration, fat concentration, salt concentration, and solids non-fat concentration determination are detailed more fully below.

All samples are refrigerated at 4° C., unless being prepared for sample analysis. Samples that are being prepared for analysis must fist be tempered to room temperature (about 20° C. to about 25° C.) prior to sample analysis.

Moisture Determination

To determine the moisture concentration of an original sample, a clean, dry aluminum beaker that has been tempered to room temperature (about 20° C. to about 25° C.) is weighed on an analytical balance with a sensitivity of 0.1 milligrams. The material to be sampled is then warmed and mixed to permit a representative sample to be taken. This warming of the material to be sampled may be done by heating the material to be sampled in a water bath at a temperature between about 32° C. and about 35° C. Care must be taken to avoid any phase separation in the sample. Phase separation of liquid butter will typically not occur initially and will be delayed for a period of time if the temperature of the water bath is held below about 43° C. Alternatively, the material to be sampled may be warmed at room temperature until the material reaches a consistency that permits mixing and subsequent sampling of the material.

About 10 grams of a well mixed sample (the "original sample") is placed into the aluminum beaker and accurately weighed on the analytical balance. The sample in the aluminum beaker is then heated on a hot plate or an equivalent heat source, while swirling the sample continuously to avoid spattering and burning of any milk solids contained in the sample. Heating is continued to cause evaporation of water from the sample until all foaming and bubbling of the sample has stopped and any milk solids contained in the sample appear light brown in color.

For oil and butterfat samples that contain little moisture, evaporation of any moisture content may only take between about 30 and about 60 seconds. Care should be taken to obtain a uniform color between each sample being analyzed for water concentration. If a dark brown color appears in the sample that is being heated, the milk solids content of the sample have been burned and this sample should be rerun.

After evaporation on the hot plate has been completed, the aluminum beaker is cooled to room temperature (about 20° C. to about 25° C.). Thereafter, the aluminum beaker and its contents are weighed on the analytical balance and the weight is recorded as the "weight of beaker+moisture-free residue.

The weight percent of moisture in the sample, based on the total weight of the sample, may be determined in accordance with the following calculations:

$$\text{Weight of Original Sample} = [(\text{Weight of beaker} + \text{original sample}) - \text{weight of beaker}]$$

$$\% \text{ Moisture} = \frac{(\text{Weight of beaker} + \text{original sample}) - (\text{Weight of beaker} + \text{moisture-free residue})}{\text{Weight of Original Sample}} \times 100$$

Fat Analysis

The fat concentration of the original sample is then determined by placing the aluminum beaker containing the moisture-free residue from the moisture-determination step in a slanted beaker holder under an exhaust hood. Then, 100 milliliters of petroleum ether is measured into the aluminum beaker. Next, the mixture of the sample and the added ether is stirred using a rubber policeman to dissolve the fat contained in the sample. Stirring is then stopped and the sample is allowed to rest for at least about 3 minutes to permit any solids in the sample to settle. Thereafter, using a vacuum source, the ether/fat mixture is carefully suctioned from the beaker, while being careful not to suction any of the milk solids that have dropped to the bottom of the beaker.

Then, 75 milliliters of petroleum ether is measured into the beaker and the contents of the beaker are again stirred with the rubber policeman to dissolve additional fat. Stirring is again stopped and the beaker is allowed to rest at least 3 minutes to permit solids to settle to the bottom of the beaker. The vacuum source is again applied to suction the mixture of ether and fat from the beaker, while being careful not to suction any milk solids from the beaker.

Fifty milliliters of petroleum ether is placed into the beaker and stirred again with the rubber policeman to dissolve any fat remaining in the sample. The beaker is allowed to rest at least three minutes to permit settling of any solids in the beaker. The vacuum apparatus is again applied to carefully suction the mixture of fat and ether from the beaker, while again being careful not to suction any milk solids from the beaker.

The beaker is allowed to dry under the fume exhaust hood until the beaker and its contents attain a constant weight, as determined by measurement on the analytical balance. After the beaker has attained a constant weight, the weight of the beaker and its contents is determined and this weight is recorded as "weight of beaker+fat-free residue". Then, the weight percent of fat in the original sample, based upon the total weight of the original sample, is calculated using the following formula:

$$\% \text{ Fat} = \frac{(\text{Weight of beaker} + \text{Moisture-free residue}) - (\text{Weight of beaker} + \text{fat-free residue})}{\text{Weight of Original Sample}} \times 100$$

Salt Analysis

Reverse osmosis/distilled water is heated to a temperature of about 65° C. to about 70° C. One hundred fifty (150)

milliliters of the heated water is measured into the beaker containing the fat-free residue obtained in the fat analysis procedure. A rubber policeman is used to stir the contents of the beaker to dissolve the salt in the hot water. The beaker and its contents are allowed to cool to room temperature (about 20° C. to about 25° C.). A twenty-five milliliter sample of the water/salt mixture in the beaker is withdrawn and pipetted into a 125 milliliter Erlenmeyer flash To prevent withdrawal of milk solids from the beaker, the tip of the pipet must be held off of the bottom of the beaker while withdrawing the water/salt sample. Two to three drops of potassium chromate indicator are placed in to the Erlenmeyer flask. The contents of the Erlenmeyer flask are then titrated with 0.0171 N(normal) silver nitrate solution until the first reddish-brown color lasting 30 seconds is obtained in the sample being titrated. Thereafter, the weight percent of salt, based upon the total weight of the original sample, is determined using the following formula:

$$\% \text{ Salt} = \frac{\text{milliliters of silver nitrate}(AgNO_3)}{\text{Weight of Original Sample}} \times 100$$

Solids Non-fat Determination

After the weight percent of moisture, fat, and salt in the original sample have been determined, these percentages are plugged into the following formula to determine the weight percent of solids non-fat, based on the total weight of the original sample, that is contained in the original sample:

% Solids non-fat=100%−(% Moisture+% Fat+% Salt)

General Comments About the Fat, Moisture, Salt, and Solids Non-fat Determinations The detection limit of this method for moisture, fat, salt, and solids non-fat is 0.01 weight percent. Any results less than 0.01 weight percent should be reported as "less than 0.01 weigh percent". At least one duplicate analysis that includes moisture, fat, salt, and solids non-fat should be conducted each day the analysis is performed. Also, at least one in every twenty samples should be analyzed in duplicate for moisture, fat, salt, and solids non-fat. Suitable differences between duplicates are listed below:

Moisture: 0.30 weight percent
Fat: 0.40 weight percent
Salt: 0.10 weight percent
Solids non-fat: 0.10 weight percent

Phospholipids Determination

Unless otherwise indicated, all determinations of phospholipids concentration are determined in accordance with the rapid high performance liquid chromatography (rapid HPLC method) that is set forth in the article entitled *Phospholipids in Milk and Dairy Products* by W. W. Christie, R. C. Noble, and G. Davies that appears in Volume 40, Number 1 of the *Journal of the Science of Dairy Technology* dated February, 1987. This *Phospholipids in Milk and Dairy Products* article is consequently incorporated by reference in its entirety. All samples to be analyzed in accordance with this Phospholipids Determination procedure are refrigerated at 4° C., unless being prepared for sample analysis. Samples that are being prepared for analysis in accordance with this Phospholipids Determination procedure should first be tempered to room temperature (about 20° C. to about 25° C.) prior to sample analysis.

EXAMPLES

The present invention is more particularly described in the following Examples which are intended as illustrations only since numerous modifications and variations within the scope of the present invention will be apparent to those skilled in the art.

Example 1

This example illustrates use of the process of the present invention to transform a blend of salted butter and unsalted butter into a butter/margarine blend. First, a butter mixture with a weight of about 3596 grams that contained about 59 weight percent salted butter and about 41 weight percent unsalted butter, based on the total weight of the butter mixture, was placed in a heavy-bottom, stainless steel pan. The stainless steel pan was slowly heated to melt the blend of salted butter and unsalted butter. The moisture concentration of the melted butter blend was determined to be about 17.2 weight percent, based on the total weight of the melted butter blend.

After determining the moisture concentration of the melted butter blend, the stainless steel pan was further heated on low to bring the melted butter blend to a rolling boil. The boiling butter blend was agitated with a Type RZRI lab mixer that may be obtained from Caframo, Ltd. of Wiarton, Ontario, Canada. The Cafrarno lab mixer was operated at set point 5. The Caframo lab mixer had a four blade mixer with an overall mixer blade diameter of 1⅞ inches (4.76 centimeters). The four blade mixer was operated at about 1520 revolutions per minute (rpm). While being agitated, the temperature of the boiling butter blend ranged from about 208° F. (about 97.8° C.) to about 218° F. (about 103.3° C.). The butter blend was agitated and boiled to remove water until the concentration of water in the boiling butter blend reached about 8.7 weight percent, based on the total weight of the boiling butter blend. Thus, about 326 grams of the original 601 grams of water in the initial butter blend were removed, leaving about 276 grams of water in the concentrated butter blend that resulted from boiling the initial butter blend.

The concentrated butter blend obtained by evaporating water was then cooled and frozen overnight to help separate the aqueous phase of the butter blend from the fat phase of the butter blend. The following day, the frozen concentrated butter blend was slowly reheated in the stainless steel pan to liquify the fat until the fat layer and aqueous layer fully stratified. Then, 2783 grams of butterfat were extracted from the stratified concentrated butter blend to form a butter solids intermediate that contained primarily water, interfacial butter solids, butterfat, and salt Thereafter, 755 grams of Cargill CV-65 canola oil available from Cargill Corporation of Minnetonka, Minn. and 761 grams of the withdrawn butterfat were combined and mixed to form a homogeneous fat mixture. Next, under conditions of high shear mixing, the butter solids intermediate was slowly added to the homogeneous fat mixture of the butterfat and canola oil to form a water-in-fat dispersion with a continuous fat phase.

After addition of the butter solids intermediate to the canola oil and the butterfat, the water-in-fat dispersion was agitated while being cooled to permit formation of the water-in-fat matrix characteristic of margarines and butter and to permit crystallization of the fat in the completed butter/margarine blend. Specifically, the mixture of the butter solids intermediate, the canola oil, and the butterfat was placed into a stainless steel beaker. The stainless steel beaker was then placed in an ice water bath. The Caframo type RZRI lab mixer was then positioned proximate the beaker with the mixer blade located in the beaker. The mixer was then turned on at set point 5 at approximately 1520 rpm to convert the mixture into a water-in-fat dispersion and crystallize the butterfat. The beaker was rotated in a direction counter to the direction of the mixer blade rotation and a stainless steel spatula was used to continuously sweep solidified fat from the inside surface of the beaker. This process was maintained until sufficient fat had solidified to form a fairly homogeneous mass.

The starting composition of the salted/unsalted butter blend and the final composition of the completed butter/margarine blend, along with component removal and additional details, are presented in Table 1, which appears later in this example. Again, during the initial evaporation phase, 326 grams of water were removed from the aqueous phase of the melted butter blend. Thereafter, 2783 grams of butterfat were removed and 755 grams of canola oil and 761 grams of the withdrawn butterfat were added back to the in-process blend. Though no data was obtained on the amount of interfacial butter solids initially present in the salted/unsalted butter blend or in the completed butter/margarine blend, it is believed that all, or essentially all, of the interfacial butter solids originally present in the salted/unsalted butter blend remained in the butter/margarine blend, since no solids were removed during evaporation of the water and since no solids were visually observed to have been removed during extraction of the butterfat from the salted/unsalted butter blend.

vegetable oil and salt to form a butter/margarine blend. First, 3500 pounds (about 1588 kilograms) of unsalted butter were melted in a steam jacketed melt tank at a temperature ranging from about 120° F. (about 48.9° C.) to about 140° F. (about 60° C.). The unsalted butter had the composition listed in Table 2 below. The melted, unsalted butter was then passed through a vacuum can that was maintained at about 28 inches (about 71 centimeters) of mercury vacuum. The melted unsalted butter was introduced into the vacuum can at a temperature of about 200° F. (about 93.3° C.). The vacuum can had a capacity of about 100 to about 150 gallons (about 378 to about 568 liters) and was a SENIOR™ vacuum chamber that may be obtained from Kussell Equipment Co. of Watertown, Wis. Only about 20% of the volume of the vacuum can was occupied by the melted unsalted butter at any one time. About 276 pounds (about 125 kilograms) of water were removed from the melted unsalted butter in the vacuum can.

The reduced-water content unsalted butter produced in the vacuum can was then sent to a separator and permitted to separate into butterfat and butter solids intermediate. In this example, the separator was the BMRPX-S314 separator that is available from Alfa-Laval Separation, Inc. This centrifuge had a bowl speed of about 5,000 revolutions per minute (rpm). Steam was injected into the reduced-water content unsalted butter prior to the separator to maintain a minimum temperature of about 150° F. (about 65.6° C.) at the inlet to the separator. This steam injection was determined to have added about 27 pounds (about 12.2 kilograms) of water to the reduced-water content unsalted butter prior to the separator.

TABLE 1

| Feed | | | | Butter Components Removal (grams) | Components Added To Butter Solids Intermediate | | Product | | |
|---|---|---|---|---|---|---|---|---|---|
| | | Composition | | | | | | Composition | |
| Ingredient | Component | Wt % | Grams | | Ingredient | Grams | Component | Wt % | Grams |
| Butter | Water | 17.20 | 601.3 | 325.5 | | | Water | 14.48 | 275.7 |
| | Butterfat | 80.29 | 2807 | 2783 | Butterfat | 761 | Butterfat | 41.25 | 785 |
| | Salt | 0.83 | 28.9 | | | | Salt | 1.52 | 28.9 |
| | SNF* | 1.68 | 58.6 | | | | SNF* | 3.08 | 58.6 |
| | | | | | Canola Oil | 755 | Canola Oil | 39.67 | 755 |
| TOTAL | | 100.00 | 3495.8 | | TOTAL | 1516 | TOTAL | 100.00 | 1903.2 |

*Solids Non-Fat

Samples of butter and samples of the butter/margarine blend produced in accordance with this example were taste tested by a panel of tasters. The panel of tasters overwhelmingly preferred the taste of the butter/margarine blend to the taste of the butter because the butter/margarine blend had a richer butter taste than did the butter itself This is believed due to the higher interfacial butter solids concentration in the butter/margarine blend, versus the interfacial butter solids concentration in the butter considered by the taste panel. The taste panel's preference of the butter/margarine blend over butter alone occurred even though the butter/margarine blend of this example, and thus the interfacial butter solids, were somewhat process abused during processing to form the butter/margarine blend, since the butter was actually boiled to effect evaporation of water. Processing at reduced temperature conditions would be expected to further enhance the preference of the taste panel for the butter/margarine blend.

Example 2

This example illustrates removal of butterfat and moisture from unsalted butter along with subsequent addition of In the separator, the reduced-water content unsalted butter (including the added 27 pounds (about 12.2 kilograms) of steam injection water) was split into about 2,832 pounds (about 1285 kilograms) of butterfat and about 419 pounds (about 190 kilograms) of butter solids intermediate. The butterfat and butter solids intermediate were each routed to separate storage tanks. Thereafter, 800 pounds (about 363 kilograms) of HM 1019 oil blend and 800 pounds (about 363 kilograms) of the withdrawn butterfat were combined in a mix tank and were mixed to form a homogeneous fat mixture. HM-1019 oil blend is a blend of partially hydrogenated soybean oil and partially hydrogenated cotton seed oil that is available from Harvest States Coop of Mankota, Minn. Next, under conditions of high shear mixing in the mix tank about 352 pounds (about 160 kilograms) of the butter solids intermediate (about 306 pounds (about 138 kilograms) of water (and phospholipids) and about 46 pounds (about 20.8 kilograms) of solids non-fat) was slowly added to the homogeneous fat mixture of the butterfat and the HM 1019 oil blend to form a homogeneous water-in-fat dispersion with a continuous fat phase. Then, about 35.8 pounds (about 16.2 kilograms) of salt were combined with the water-in-fat dispersion in the mix tank. In this example, the high shear mixing was accomplished using a center post agitator and side mounted baffles that were mounted within the mix tank.

Additionally, about 2.7 grams of betacarotene and about 29 grams of Vitamin A were added to the mix tank. The contents of the mix tank were maintained at a temperature of about 115° F. (about 46.1° C.) and blended in the mix tank using the agitator to attain the homogeneous water-in-fat dispersion. This dispersion was transferred from the mix lank to a blend tank where the dispersion was maintained using an agitator and baffle like those in the mix tank. Additionally, the dispersion was maintained at a temperature of about 115° F. (about 46.1° C.) in the blend tank.

The dispersion was pumped from the blend tank through a two-barrel swept surface heat exchanger, a Votator® 672DE swept surface heat exchanger that is available from Waukesha Cherry-Burrell, to more fully develop the water-in-fat dispersion, crystalize fat, and thereby form a butter/margarine blend in accordance with the present invention. The swept surface heat exchanger had both a lower barrel and an upper barrel. The lower barrel predominantly accomplished crystallization of fat in the water-in-fat dispersion, and the upper barrel thereafter worked the product of the lower barrel. The exit temperature of the lower barrel was about 80° F. (about 26.7° C.) and the exit temperature of the upper barrel, after working, was set at about 60° F. (about 15.6° C.). The lower barrel was operated at about 550 to about 600 revolutions per minute, whereas the upper barrel was found to cause minimal lumping and produce a smooth product at an operating speed of about 510 revolutions per minute.

The composition of the butter used as feed in this example and the composition of the butter/margarine blend product produced in this example, along with details about component removal from the butter feed and component addition to the butter solids intermediate arc present in Table 2 below:

solids non-fat and about 336.5 pounds (about 152.6 kilograms) of water (and phospholipids). Of this 419 pounds (about 190 kilograms) of butter solids intermediate, only about 352 pounds (about 46 pounds (about 20.8 kilograms) of solids non-fat and about 306 pounds (about 139 kilograms) of water (and phospholipids)) were added to the mix tank. The remaining 67 pounds (about 30.3 kilograms) of butter solids intermediate produced at the separator and about 2,030 pounds (about 921 kilograms) of butterfat produced at the separator were discarded and not used in forming the butter/margarine blend product of this example.

Example 3

This example illustrates removal of butterfat and moisture from lightly salted butter along with subsequent addition of vegetable oil to form a butter/margarine blend. First, 2200 pounds (about 998 kilograms) of salted butter were melted in a steam jacketed melt tank at a temperature ranging from about 120° F. (about 48.9° C.) to about 140° F. (about 60° C.). The lightly salted butter had the composition listed in Table 3 below. The melted butter was then processed through the third effect of a triple effect evaporator that was maintained at about 25 inches (about 63.5 centimeters) of mercury vacuum. The melted butter was introduced into the evaporator at a temperature of about 136° F. (about 57.8° C.).

This third effect of the triple effect evaporator was actually a finishing effect for small volumes that followed a larger double effect evaporator. The double effect evaporator was not used in this example. Only the finishing effect (the third effect) was used for water evaporation from the melted butter in this example. This finishing effect evaporator was a falling film evaporator that is available from Marriott Walker Corporation of Birmingham, Michigan. Vacuum on this falling film evaporator was provided by a thermal compressor that is available from Croll-Reynolds Company of Westfield, N.J. The evaporator removed approximately 292 pounds (about 132.5 kilograms) to about 300 pounds (about 136 kilograms) of water from the melted butter.

TABLE 2

| | Feed | | | Pounds of Butter | Components Added To Butter Solids Intermediate | | Product | | |
|---|---|---|---|---|---|---|---|---|---|
| | | Composition | | Component | | | | Composition | |
| Ingredient | Component | Wt % | Pounds (kg) | Removal (kg) | Ingredient | Pounds (kg) | Component | Wt % | Pounds (kg) |
| Butter | Water | 17.75 | 612.5 (~278) | 276 (~125) | | | Water | 15.40 | 306.25 (~) |
| | Butterfat | 82.10 | 2832 (~1285) | 2832 (~1284) | Butterfat | 800 (~363) | Butterfat | 40.24 | 800 (~363) |
| | Salt | 0.00 | 0 (0) | | Salt | 35.8 (~16) | Salt | 1.81 | 35.8 (~16) |
| | SNF* | 0.15 | 55.1 (~25) | | | | SNF* | 2.31 | 46 (~21) |
| | | | | | Oil** | 800 (~363) | Oil** | 40.24 | 800 (~363) |
| | TOTAL | 100.00 | 3499.6 (~1588) | | TOTAL | 1636 (~742) | TOTAL | 100.00 | 1988.05 (~902) |

*Solids Non-Fat
**HM 1019 oil blend

In addition to the details provided in Table 2, it was determined that the interfacial butter solids produced at the separator weighed about 419 pounds (about 190 kilograms) and included about 55.5 pounds (about 25.2 kilograms) of The reduced-water melted butter was then sent to a separator to permit splitting of butterfat and a butter solids intermediate. The butter solids intermediate contained most of the interfacial butter solids from the reduced-water melted butter. The separator in this example was a 500 gallon (1892 liter)jacketed steel tank equipped with a cone-shaped bottom. Thus, gravity separation was used to split the butterfat and the butter solids intermediate in this example. Approximately 1,200 pounds (about 544 kilograms) to 1,250 pounds (about 567 kilograms) of butterfat was removed from the separator tank. The butter solids intermediate that was removed from the separator was routed to a storage tank.

After the partial butterfat removal, the remaining contents (as butterfat) of the separator tank were sent to a mix tank. This mix tank had a cone-shaped bottom and a capacity of about 500 gallons (about 1892 liters). The mix tank also had a center-mounted agitator and tank-mounted baffles. In the mix tank, 244 pounds (about 110.7 kilograms) of HM508 oil blend and 131 pounds (about 59.4 kilograms) of liquid soybean oil were combined with the butterfat contents transferred from the separator tank to form a homogeneous fat blend. The HM508 oil blend is a partially hydrogenated soybean oil that is available from Harvest States Coop of Mankato, Minn. Thereafter, under conditions of high shear mixing in the mix tank, the butter solids intermediate that was removed from the reduced-water melted butter in the separator was slowly added to the homogeneous fat blend of the butterfat and the HM508 oil blend to form a homogeneous water-in-fat dispersion with a continuous fat phase. In this example, the high shear mixing was accomplished using the center post agitator and side mounted baffles that were mounted within the mix tank.

The water-in-fat dispersion was transferred from the mix tank to a swept surface heat exchanger. In this example, the swept surface heat exchanger was a two-barrel Votator® 672DE swept surface heat exchanger that is available from Waukesha Cherry-Burrell of Delavan, Wis. Using ammonia as the cooling medium, the swept surface heat exchanger was operated to crystalize the fat in the water-in-fat dispersion to transform the water-in-fat dispersion into a water-in-fat matrix and subsequently work the water-in-fat matrix. The composition of the butter feed and the composition of the product produced in this example, along with details about component removal and component addition, are presented in Table 3 below.

The water removal number of 219 pounds (about 99.3 kilograms) in Table 3 does not reflect the actual measured amount of water removed from the butter for at least a couple of reasons. First, about 133 extra pounds (about 60.3 kilograms) of water were inadvertently added to the melted butter during processing through the evaporator. It is believed that the water was either added to the melted butter during transfer of the melted butter to the evaporator or in the evaporator itself. Secondly, some of the materials being transferred from the mix tank to the exchanger were left in the transfer line after processing was complete in the exchanger. This loss of water during exchanger processing and the gain of water proximate the evaporator are believed to be reflected in the 219 pounds (about 99.3 kilograms) of water removal that is shown in Table 3, versus the observed water removal of about 292 pounds (about 132.5 kilograms) to about 300 pounds (about 136 kilograms) in the evaporator.

Additionally, salt removal and solids non-fat removal are shown in Table 3. This removal of salt and solids non-fat is believed attributable to material remaining in the transfer line from the mix tank to the exchanger following production of the butter/margarine blend in the exchanger. Similarly, the fat removal number of 1,398 pounds (about 634 kilograms) in Table 3 is larger than the observed removal of about 1,200 pounds (about 544 kilograms) to about 1,250 pounds (about 567 kilograms) of butterfat. This difference in butterfat removal is likewise believed attributable to line losses similar to the noted line loss of salt and solids non-fat.

TABLE 3

| Feed | | | | Pounds of Butter | Components Added To Butter | | Product | | |
|---|---|---|---|---|---|---|---|---|---|
| | | Composition | | Component | Solids Intermediate | | | Composition | |
| Ingredient | Component | Wt % | Pounds (kg) | Removal (kg) | Ingredient | Pounds (kg) | Component | Wt % | Pounds (kg) |
| Butter | Water | 14.71 | 323.6 (~147) | 219 (~99) | | | Water | 11.09 | 104.6 (~47) |
| | Butterfat | 82.96 | 1825 (~828) | 1398 (~634) | Butterfat | 427 (~194) | Butterfat | 45.29 | 427 (~194) |
| | Salt | 0.88 | 19.4 (~8) | 3.7 (~2) | | | Salt | 1.67 | 15.7 (~7) |
| | SNF** | 1.45 | 32 (~14) | | | | SNF** | 2.18 | 20.6 (~9) |
| | | | | | Oil*** | 131 (~60) | Oil*** | 13.89 | 131 (~60) |
| | | | | | Oil**** | 244 (~111) | Oil**** | 25.88 | 244 (~111) |
| TOTAL | | 100.00 | 2200 (~998) | 1620.7 (~735) | TOTAL | 802 (~364) | TOTAL | 100.00 | 942.9 (~428) |

*Includes approximately 133 pounds (about 60.3 kilograms) of process water that was inadvertently added to the cream feed during transfer of the cream feed to the evaporator
**Solids Non-Fat
***liquid soybean oil
****HM508 oil blend The butter/margarine blend produced in this example was taste tested by a panel of tasters and was also incorporated into baked goods. The panel of taste testers preferred the butter/margarine blend of this example over Grade AA salted butter, because the butter/margarine blend had a richer butter taste than even the Grade AA salted butter. Also, the taste panel observed that the butter/margarine blend had an improved mouth-feel even compared to the mouth-feel of Grade AA salted butter. Additionally, it was observed that the butter/margarine blend was easier to spread on bread than Grade AA salted butter that had not been presoftened. Finally, when baking using the butter/margarine blend, it was observed that the butter/margarine blend produced enhanced body in baked goods, as compared to the body of baked goods that incorporated Grade AA salted butter, and also increased the uniformity and rate at which the baked goods browned, as compared to baked goods incorporating Grade AA butter.

Comparative Example No. 1

In this comparative example, an attempt was made to produce margarine by starting with cream containing 40 weight percent milk fat, based upon the starting weight of the cream, instead of starting with churned butter, to create a margarine In Table 4 below, the pounds of water shown for the cream feed (40 wt % fat) is about 400 pounds (about 181.4 kilograms) greater than for the cream feed alone because approximately 400 pounds (about 181.4 kilograms) of process water was inadvertently added to the cream feed during transfer of the cream feed to the evaporator.

The cream was fed to a falling film evaporator, similar to the falling film evaporator used in Example 3, that is exchanger was a Votator® 672DE swept surface heat exchanger available from Waukesha Cheny-Burrell. The water-in-fat/oil dispersion was processed through the swept surface heat exchanger to an outlet temperature of about 58° F. (about 14.4° C.).

The composition of the cream used as feed in this comparative example, and the product composition, along with component removal and addition details, are presented in Table 4 below. The intended amount of water removal in this comparative example was less than the actual amount of water removal that is shown in Table 4 as being removed. Approximately 400 pounds (about 181.4 kilograms) of extra water was removed in the evaporator to compensate for the approximately 400 pounds (about 181.4 kilograms) of process water that was inadvertently added to the cream feed to the evaporator. Also, some unintended butterfat removal, along with some unintended water removal, occurred as a result of line losses between the mix tank and the crystalizing exchanger. Furthermore, some solids non-fat removal likewise occurred due to line losses in the line connecting the mix tank and the crystalizing exchanger.

TABLE 4

| Feed | | | | Pounds of Component Removal (kg) | Components Added To The Concentrated Cream Feed | | Product | | |
|---|---|---|---|---|---|---|---|---|---|
| Ingredient | Component | Wt % | Pounds (kg) | | Ingredient | Pounds (kg) | Component | Wt % | Pounds (kg) |
| Cream* | Water | 67.98 | 964* (~436) | 853.2 (~296) | | | Water | 12.80 | 110.8 (~50) |
| | Butterfat | 28.21 | 400 (~181) | 52 (~24) | Butterfat | 0 (0) | Butterfat | 40.19 | 348 (~158) |
| | Salt | 0.00 | 0 (0) | | Salt | 13.4 (~6) | Salt | 1.55 | 13.4 (~6) |
| | SNF** | 3.81 | 54 (~24) | | | | SNF** | 5.28 | 45.7 (~21) |
| | | | | | Oil*** | 226 (~102) | Oil*** | 26.10 | 226 (~102) |
| | | | | | Oil**** | 122 (~55) | Oil**** | 14.08 | 122 (~55) |
| TOTAL | | 100.00 | 1418 (~643) | | TOTAL | 361.4 (~163) | TOTAL | 100.00 | 865.9 (~392) |

*Includes approximately 400 pounds (about 181.4 kilograms) of process water that was inadvertently added to the cream feed during transfer of the cream feed to the evaporator
**Solids Non-Fat
***hydrogenated soybean oil
****liquid soybean oil available from Marriott Walker Corporation of Birmingham, Mich. Vacuum on this falling film evaporator was provided by a thermal compressor that is available from Croll-Reynolds Company of Westfield, N.J. The cream was introduced into the evaporator at a temperature of about 136° F. (about 57.8° C.). After water was removed in the evaporator, the reduced moisture cream was placed in a mix tank and combined with some hydrogenated soybean oil and some liquid soybean oil, along with some salt.

Thereafter, the mixture of reduced moisture cream and soybean oil was blended using an agitator in the mix tank to form a homogeneous water-in-fat/oil dispersion. The water-in-fat/oil dispersion was then transferred to a crystalizing exchanger. In this comparative example, the crystalizing This comparative example yielded two striking observations. First, during processing of the cream in the evaporator, it was observed that significant fouling and clogging occurred in the evaporator. This is believed to be a result of the aqueous phase of the cream containing an excessive amount of solids as evaporation of water proceeded, since a much larger percentage of incoming water must be evaporated from cream containing 40 weight percent fat, as compared to the amount of water to be evaporated from butter, to achieve a similar fat/water ratio in the completed product.

Furthermore, the initial concentration of solids in cream containing 40 weight percent fat is significantly higher than the concentration of comparable solids in butter, since churning of cream to form butter removes, in the butter milk product of the churning process, a significant amount of solids from the incoming cream being churned. The evaporator clogging problem significantly reduced the flow rate of cream through the evaporator as fouling and clogging increased in the evaporator during the run. Nonetheless, some flow of reduced water cream through the evaporator did continue so that margarine was ultimately able to be formed in the crystallizing exchanger.

When provided to a taste panel, the tasters found that the margarine produced in this comparative example had a flavor that was not acceptable. Specifically, the flavor of the margarine, as compared to the flavor of butter, was merely milky, had a greatly diminished fatty taste or mouth-feel, and virtually no butter flavor, as compared to butter. Thus, this comparative example demonstrates that it is not feasible or acceptable to use cream that has not been churned into butter, as a substitute for butter, in or as the feed material 12 of the present invention.

Although the present invention has been described with reference to preferred embodiments, workers skilled in the art will recognize that changes may be made in form and detail without departing from the spirit and scope of the invention.

What is claimed is:

1. A method of forming a butter-based product, the method comprising:
   removing water or butterfat from a feed material to yield an intermediate, the feed material comprising butter;
   combining a non-dairy fat with the intermediate to form an intermediate blend; and
   processing the intermediate blend to form the butter-based product.

2. The method of claim 1, the method further comprising combining butterfat with the non-dairy fat and the intermediate to form the intermediate blend.

3. The method of claim 1 wherein processing the intermediate blend comprises transforming the intermediate blend into a water-in-fat dispersion.

4. The method of claim 1 wherein the feed material comprises interfacial butter solids and the intermediate comprises interfacial butter solids, at least about 95 weight percent of the interfacial butter solids of the feed material, based on the total weight of the interfacial butter solids in the feed material, being present in the intermediate.

5. The method of claim 1 wherein:
   the feed material comprises an interfacial butter solids portion;
   the interfacial butter solids portion consist of phospholipids, proteins, and sugars; and
   at least about 95 weight percent of the interfacial butter solids portion, based on the total weight of the interfacial butter solids portion in the feed material, being present in the intermediate.

6. The method of claim 1 wherein removing water or butterfat from the feed material comprises removing water or butterfat from the butter.

7. The method of claim 6, the method further comprising heating the feed material to melt the butter and form melted butter, and wherein removing water or butterfat from the butter comprises removing water or butterfat from the melted butter.

8. The method of claim 1 wherein removing water from the feed material comprises evaporating water from the feed material.

9. The method of claim 1 wherein removing water from the feed material comprises freeze drying the feed material or spray drying the feed material.

10. The method of claim 1 wherein the non-dairy fat is selected from the group consisting of animal fat, plant fat, and any of these in any combination.

11. The method of claim 1 wherein the butter comprises interfacial butter solids, the concentration of interfacial butter solids being higher in the butter-based product than the concentration of interfacial butter solids in the butter.

12. The method of claim 1 wherein the butter comprises interfacial butter solids, the concentration of interfacial butter solids being higher in the butter-based product than the concentration of interfacial butter solids in the feed material.

13. The method of claim 1 wherein:
   the butter comprises a fist interfacial butter solids portion;
   the first interfacial butter solids portion consists of phospholipids, proteins, and sugars;
   the butter-based product comprises a second interfacial butter solids portion;
   the second interfacial butter solids portion consists of phospholipids, proteins, and sugars; and
   the concentration of the second interfacial butter solids portion in the butter-based product, based upon the total weight of the butter-based product, is higher than the concentration of the first interfacial butter solids portion in the butter, based upon the total weight of the butter.

14. The method of claim 1 wherein:
   the feed material comprises a first interfacial butter solids portion;
   the first interfacial butter solids portion consists of phospholipids, proteins, and sugars;
   the butter-based product comprises a second interfacial butter solids portion;
   the second interfacial butter solids portion consists of phospholipids, proteins, and sugars; and
   the concentration of the second interfacial butter solids portion in the butter-based product, based upon the total weight of the butter-based product, is higher than the concentration of the first interfacial butter solids portion in the feed material, based upon the total weight of the feed material.

15. A method of processing butter, the butter comprising interfacial butter solids, the method comprising:
   melting the butter; and
   removing water or butterfat from the melted butter, to form a concentrated butter product, the concentrated butter product comprising:
      butterfat; and
      substantially all of the interfacial butter solids present in the butter.

16. The method of claim 15 wherein the concentration of interfacial butter solids is higher in the concentrated butter product than the concentration of interfacial butter solids in the butter.

17. The method of claim 15, the method further comprising combining a non-dairy fat with the concentrated butter product.

18. A method of forming a butter-based product, the method comprising:
   removing water or butterfat from a feed material to yield an intermediate, the feed material comprising butter and non-dairy fat and the intermediate comprising water, butterfat, and non-dairy fat;
   crystallizing butterfat in the intermediate to form the butter-based product.

19. The method of claim 18 wherein the butter comprises interfacial butter solids, the concentration of interfacial butter solids being higher in the butter-based product than the concentration of interracial butter solids in the butter.

20. A method of forming a butter-based product, the method comprising:
   removing water from a feed material to yield a first intermediate, the feed material comprising butter;
   removing butterfat from the first intermediate to yield a second intermediate, the second intermediate comprising butterfat and interfacial butter solids; and
   crystallizing butterfat that is present in the second intermediate to form the butter-based product.

21. The method of claim 20 wherein the butter comprises interfacial butter solids, the concentration of interfacial butter solids in the butter-based product being higher than the concentration of interfacial butter solids in the butter.

22. The method of claim 20 wherein the butter comprises interfacial butter solids, the concentration of interfacial butter solids being higher in the butter-based product than the concentration of interfacial butter solids in the feed material.

23. The method of claim 20 wherein:
   the butter comprises a first interfacial butter solids portion;
   the first interfacial butter solids portion consists of phospholipids, proteins, and sugars;
   the butter-based product comprises a second interfacial butter solids portion;
   the second interfacial butter solids portion consists of phospholipids, proteins, and sugars; and
   the concentration of the second interfacial butter solids portion in the butter-based product, based upon the total weight of the butter-based product, is higher than the concentration of the first interfacial butter solids portion in the butter, based upon the total weight of the butter.

24. The method of claim 20 wherein:
   the feed material comprises a first interfacial butter solids portion;
   the first interfacial butter solids portion consists of phospholipids, proteins, and sugars;
   the butter-based product comprises a second interfacial butter solids portion;
   the second interfacial butter solids portion consists of phospholipids, proteins, and sugars; and
   the concentration of the second interfacial butter solids portion in the butter-based product, based upon the total weight of the butter-based product, is higher than the concentration of the first interfacial butter solids portion in the feed material, based upon the total weight of the feed material.

25. The method of claim 20, the method further comprising adding non-dairy fat to the second intermediate prior to crystallizing butterfat.

26. The method of claim 20, the method further comprising adding butterfat to the second intermediate prior to crystallizing butterfat.

27. The method of claim 20 wherein the feed material comprises interfacial butter solids, at least about 95 weight percent of the interfacial butter solids of the feed material, based on the total weight of the interfacial butter solids in the feed material, being present in the second intermediate.

28. The method of claim 20 wherein:
   the feed material comprises an interfacial butter solids portion;
   the interfacial butter solids portion consist of phospholipids, proteins, and sugars; and
   at least about 95 weight percent of the interfacial butter solids portion, based on the total weight of the interfacial butter solids portion in the feed material, being present in the intermediate.

29. A butter-based product derived from butter wherein the butter comprises interfacial butter solids, the butter-based product comprising:
   butterfat;
   water;
   a non-dairy fat; and
   interfacial butter solids, the concentration of interfacial butter solids being higher in the butter-based product than the concentration of interfacial butter solids in the butter.

30. The butter-based product of claim 29 wherein the butter comprises water and butterfat, the weight ratio of butterfat to water in the butter-based product being different from the weight ratio of butterfat to water in the butter.

31. The butter-based product of claim 29 wherein the non-dairy fat is selected from the group consisting of animal fat, plant fat, and any of these in any combination.

32. The butter-based product of claim 29 wherein:
   the butter comprises a first interfacial butter solids portion;
   the first interfacial butter solids portion consists of phospholipids, proteins, and sugars;
   the butter-based product comprises a second interfacial butter solids portion;
   the second interfacial butter solids portion consists of phospholipids, proteins, and sugars; and
   the concentration of the second interfacial butter solids portion in the butter-based product, based upon the total weight of the butter-based product, is higher than the concentration of the first interfacial butter solids portion in the butter, based upon the total weight of the butter.

33. A concentrated butter product, the concentrated butter product derived from butter, the butter comprising interfacial butter solids, the concentrated butter product comprising:
   water;
   butterfat; and
   interfacial butter solids, the concentration of interfacial butter solids in the concentrated butter product being greater than the concentration of the interfacial butter solids in the butter.

34. The concentrated butter product of claim 33 wherein the butter further comprises water and butterfat, the weight ratio of butterfat to water in the concentrated butter product being different from the weight ratio of butterfat to water in the butter.

35. The concentrated butter product of claim 33 wherein:
   the butter comprises a first interfacial butter solids portion;
   the first interfacial butter solids portion consists of phospholipids, proteins, and sugars;
   the concentrated butter product comprises a second interfacial butter solids portion;
   the second interfacial butter solids portion consists of phospholipids, proteins, and sugars; and
   the concentration of the second interfacial butter solids portion in the concentrated butter product, based upon the total weight of the concentrated butter product, is higher than the concentration of the first interfacial butter solids portion in the butter, based upon the total weight of the butter.

36. A butter-based product, the butter-based product derived from butter, the butter comprising water, butterfat, and interfacial butter solids, the butter product comprising:

interfacial butter solids;

butterfat; and water, the weight ratio of butterfat to water in the butter product being larger than the weight ratio of butterfat to water in the butter.

37. The butter-based product of claim 36 wherein the concentration of interfacial butter solids in the butter-based product is higher than the concentration of interfacial butter solids in the butter.

38. The butter-based product of claim 36 wherein:

the butter comprises a first interfacial butter solids portion;

the first interfacial butter solids portion consists of phospholipids, proteins, and sugars;

the butter-based product comprises a second interfacial butter solids portion;

the second interfacial butter solids portion consists of phospholipids, proteins, and sugars; and the concentration of the second interfacial butter solids portion in the butter-based product, based upon the total weight of the butter-based product, is higher than the concentration of the first interfacial butter solids portion in the butter, based upon the total weight of the butter.

39. The butter-based product of claim 36, the butter-based product further comprising non-dairy fat.

* * * * *